US010641751B2

(12) United States Patent
Jayaraman et al.

(10) Patent No.: US 10,641,751 B2
(45) Date of Patent: May 5, 2020

(54) ION EXCHANGE CHROMATOGRAPHY COLUMN, METHOD, AND SYSTEM THEREOF

(71) Applicant: DIONEX CORPORATION, Sunnyvale, CA (US)

(72) Inventors: Manikandan Jayaraman, San Jose, CA (US); Christopher A. Pohl, Union City, CA (US); Charanjit Saini, Fremont, CA (US)

(73) Assignee: Dionex Corporation, Sunnyvale, CA (US)

( * ) Notice: Subject to any disclaimer, the term of this patent is extended or adjusted under 35 U.S.C. 154(b) by 384 days.

(21) Appl. No.: 14/744,348

(22) Filed: Jun. 19, 2015

(65) Prior Publication Data

US 2016/0370329 A1    Dec. 22, 2016

(51) Int. Cl.
*G01N 30/02* (2006.01)
*G01N 30/96* (2006.01)
(Continued)

(52) U.S. Cl.
CPC ........... *G01N 30/96* (2013.01); *B01D 15/206* (2013.01); *B01D 15/362* (2013.01); *B01J 39/05* (2017.01);
(Continued)

(58) Field of Classification Search
CPC ............... G01N 30/48; G01N 30/482; G01N 2030/484; G01N 30/96; B01D 15/00;
(Continued)

(56) References Cited

U.S. PATENT DOCUMENTS 5,281,631 A    1/1994   Horwitz et al.
5,503,933 A    4/1996   Afeyan et al.
(Continued)

FOREIGN PATENT DOCUMENTS

EP      2745904 A1      6/2014
EP      003106224 A1 *  12/2016

OTHER PUBLICATIONS

Dionex IonPac CS19 Columns, Product Manual, P/N: 065440-02, Jun. 2012, 59 pages.
(Continued)

*Primary Examiner* — Jill A Warden
*Assistant Examiner* — Dwayne K Handy
(74) *Attorney, Agent, or Firm* — Timothy J. Ohara

(57) ABSTRACT

An ion exchange chromatographic packing material is described that includes support resin particles and a copolymer grafted to the support resin particles. The copolymer includes polymerized functional monomers such as a first ion exchange group monomer and a second ion exchange group monomer. At a first pH, the first ion exchange group monomer is configured to have a first charge at a first pH, and the second ion exchange group monomer is configured to have a net neutral charge. At a second pH, the first ion exchange group monomer is configured to have the first charge at a second pH, and the second ion exchange group monomer is configured to have a second charge at the second pH where the first charge and second charge both have a same polarity.

20 Claims, 10 Drawing Sheets

(51) Int. Cl.
*B01D 15/36* (2006.01)
*B01J 39/20* (2006.01)
*B01J 39/26* (2006.01)
*B01J 41/20* (2006.01)
*B01J 39/05* (2017.01)
*B01J 39/07* (2017.01)
*B01J 41/07* (2017.01)
*B01D 15/20* (2006.01)
*B01J 47/02* (2017.01)

(52) U.S. Cl.
CPC ............... *B01J 39/07* (2017.01); *B01J 39/20* (2013.01); *B01J 39/26* (2013.01); *B01J 41/07* (2017.01); *B01J 41/20* (2013.01); *B01J 47/02* (2013.01)

(58) Field of Classification Search
CPC .. B01D 2015/00; B01D 2220/48; B01J 47/04; B01J 47/014
See application file for complete search history.

(56) References Cited

U.S. PATENT DOCUMENTS

| | | | |
|---|---|---|---|
| 5,712,347 A * | 1/1998 | Trochimcznk | B01J 39/12 521/30 |
| 5,783,608 A | 7/1998 | Sugo et al. | |
| 5,865,994 A | 2/1999 | Riviello et al. | |
| 5,925,253 A | 7/1999 | Pohl et al. | |
| 5,936,003 A | 8/1999 | Pohl et al. | |
| 5,968,363 A | 10/1999 | Riviello et al. | |
| 6,248,798 B1 | 6/2001 | Slingsby et al. | |
| 6,544,484 B1 | 4/2003 | Kaufman et al. | |
| 6,568,245 B2 | 5/2003 | Kaufman | |
| 6,857,295 B2 | 2/2005 | Hansen et al. | |
| 7,147,891 B2 | 12/2006 | Bordunov et al. | |
| 7,166,226 B2 | 1/2007 | Woodruff et al. | |
| 2009/0218238 A1 | 9/2009 | Dasgupta et al. | |
| 2011/0117626 A1 | 5/2011 | Komkova et al. | |

OTHER PUBLICATIONS

Dionex Product Manual for IonPac(R) CG12A IonPac(R) CS12A, Doc No. 031132, Rev. 09, May 2010, 78 pages.

HPLC 2015 Abstract HYP-TH-0-09:20, Pohl et al., "New hybrid mode cation-exchange column for use in HPLC and ion chromatography," Jun. 2015, 3 pages.

Rey, "Novel cation-exchange stationary phase for the separation of amines and of six common inorganic cations," J. of Chrom. A, 739, 1, 87-97, 1996.

EP Extended Search Report dated Nov. 14, 2016, to EP Patent Application No. 16174343.0.

* cited by examiner

ION EXCHANGE CHROMATOGRAPHY COLUMN, METHOD, AND SYSTEM THEREOF

BACKGROUND

Chromatography is a widely used analytical technique for the chemical analysis and separation of molecules. Chromatography involves the separation of one or more analyte species from other matrix component present in a sample. A stationary phase of a chromatography column is typically selected so that there is an interaction with the analyte. Such interactions can be ionic, hydrophilic, hydrophobic, or combinations thereof. For example, the stationary phase can be derivatized with ionic moieties that ideally will bind to ionic analytes and matrix components with varying levels of affinity. A mobile phase is percolated through the stationary phase and competes with the analyte and matrix components for binding to the ionic moieties. The mobile phase is a term used to describe a liquid solvent or buffer solution that is pumped into a chromatography column inlet. During this competition, the analyte and matrix components will elute off of the stationary phase as a function of time and then be subsequently detected at a detector. Examples of some typical detectors are a conductivity detector, a UV-VIS spectrophotometer, and a mass spectrometer. Over the years, chromatography has developed into a powerful analytical tool that is useful for creating a healthier, cleaner, and safer environment where complex sample mixtures can be separated and analyzed for various industries such as water quality, environmental monitoring, food analysis, pharmaceutical, and biotechnology.

Applicant believes that there is a need for improved ion exchange chromatographic resins where the observed retention times can be tailored to a specific sample analysis such as, for example, cations of alkali metals, alkaline earth metals, and various amine compounds in water. One strategy for tailoring retention times is to vary the concentration of the ion exchange groups on the resin. In addition, Applicant also believes that there is a need for a platform chemistry that allows for reducing the ion exchange group concentration on the resin while retaining the ability to separate samples with relatively high efficiency.

SUMMARY

A chromatography column containing a packed bed of an ion exchange chromatographic packing material is described. The packing includes support resin particles and a copolymer. The copolymer includes polymerized functional monomers that include a first ion exchange group monomer and a second ion exchange group monomer, where the first ion exchange group monomer and the second ion exchange group monomer are different. The copolymer can be grafted to the support resin particles. The first ion exchange group monomer is configured to have a first charge at a first pH, and the second ion exchange group monomer is configured to have a net neutral charge at the first pH. The first ion exchange group monomer is configured to have the first charge at a second pH, and the second ion exchange group monomer is configured to have a net neutral charge or a second charge at the second pH where the first charge and second charge both have a same polarity, in which the first pH and the second pH are different. A mole percent of the second ion exchange group monomer is a mole amount of the second ion exchange group monomer divided by a summation of a mole amount of the first ion exchange group monomer and the mole amount of the second ion exchange group monomer, and multiplied by 100, the mole percent of the second ion exchange group monomer may range from about 60% to about 99%.

In regards to the above packing material, the mole percent of the second ion exchange group monomer can be based on an equation % $IEX_{2,mole} = [IEX_{2,mole}/(IEX_{1,mole} + IEX_{2,mole})] \times 100$, where % $IEX_{2,mole}$ is the mole percent for the second ion exchange group monomer, $IEX_{1,mole}$ is the mole amount of the first ion exchange group monomer, and $IEX_{2,mole}$ is the mole amount of the second ion exchange group monomer.

In regards to the any of the above packing materials, the mole percent of the second ion exchange group monomer may range from about 80% to about 95%.

In regards to the any of the above packing materials, the first ion exchange group monomer can be diluted by the second ion exchange group monomer such that 2% or less of the first ion exchange group monomers are adjacent to each other in the copolymer.

In regards to the any of the above packing materials, the polymerized functional monomers may further include a third ion exchange group monomer, where the third ion exchange group monomer is different from the first ion exchange group monomer and the second ion exchange group monomer, in which the third ion exchange group monomer is configured to have a third charge at both the first pH and the second pH, where the third charge and the first charge both have the same polarity In regards to the any of the above packing materials, a mole percent of the third ion exchange group monomer is a mole amount of the third ion exchange group monomer divided by a summation of a mole amount of a first ion exchange group monomer, a mole amount of the second ion exchange group monomer, and the mole amount of the third ion exchange group monomer, the mole percent of the third ion exchange group monomer ranges from about 2% to about 10%.

In regards to the any of the above packing materials, the mole percent of the third ion exchange group monomer is based on an equation % $IEX_{3,mole} = [IEX_{3,mole}/(IEX_{1,mole} + IEX_{2,mole} + IEX_{3,mole})] \times 100$ where % $IEX_{3,mole}$ is the mole percent for the third ion exchange group, $IEX_{1,mole}$ is the mole amount of the first ion exchange group monomer, $IEX_{2,mole}$ is the mole amount of the second ion exchange group monomer, and $IEX_{3,mole}$ is the mole amount of the third ion exchange group monomer.

In regards to the any of the above packing materials, the support resin particle can be based on a divinylbenzene crosslinking monomer and a support resin monomer. The support resin monomer can be selected from a group consisting of an ethylvinylbenzene monomer, a styrene monomer, and a combination thereof. The support resin particles can have a diameter ranging from about 2 microns to about 20 microns, and a surface area ranging from about 20 m²/g to about 800 m²/g.

In regards to the any of the above packing materials, the support resin particle can include divinylbenzene crosslinking monomer and ethylvinylbenzene monomer. A mole percent of the divinylbenzene crosslinking monomer is a mole amount of the divinylbenzene crosslinking monomer divided by a summation of the mole amount of the divinylbenzene crosslinking monomer and a mole amount of the ethylvinylbenzene monomer. The mole percent of the divinylbenzene crosslinking monomer can range from about 30% to about 99%.

In regards to the any of the above packing materials, the first ion exchange group monomer and the second ion exchange group monomer can each include a cation exchange group. The third ion exchange group monomer can include a cation exchange group. The first ion exchange group monomer can include a styrene sulfonate. The second ion exchange group monomer can include a methacrylic acid. The second ion exchange group monomer can be a zwitterion at the first pH. The third ion exchange group monomer can include a vinylphosphonate.

In regards to the any of the above packing materials, the first ion exchange group monomer, second ion exchange group monomer, and third ion exchange group monomer, respectively, have pKa value of about −2.8, 4.7, and 2.7.

An ion exchange chromatographic packing material can be made by a method. This method includes mixing a first ion exchange group monomer, a second ion exchange group monomer, and an initiator in an aqueous liquid with support resin particles to form a reaction mixture where the first ion exchange group monomer and the second ion exchange group monomer are different. The reaction mixture is at a first pH where the first ion exchange group monomer has a first charge and the second ion exchange group monomer has a net neutral charge. The reaction mixture is polymerized to form a copolymer that is grafted to the support resin particles. The copolymer includes polymerized functional monomers that include the first ion exchange group monomer and the second ion exchange group monomer. The second ion exchange group monomer of the grafted support can have a net neutral charge or a second charge where the first charge and the second charge have a same polarity at a second pH, in which the first pH and the second pH are different.

In regards to the packing material made by the above method, the reaction mixture has a mole percent for the first ion exchange group monomer ranging from about 4% to about 20%, and a mole percent for the second ion exchange group monomer ranging from about 80% to about 96%. The mole percent for the first ion exchange group monomer is a mole amount of the first ion exchange group monomer divided by a summation of the mole amount of the first ion exchange group monomer and a mole amount of the second ion exchange group monomer, and multiplied by 100. The mole percent for the second ion exchange group monomer is a mole amount of the second ion exchange group monomer divided by a summation of the mole amount of the first ion exchange group monomer and the mole amount of the second ion exchange group monomer, and multiplied by 100.

In regards to the packing material made by any of the above methods, before the polymerizing step, third ion exchange monomer can be mixed in the reaction mixture where the third ion exchange group monomer is different from the first ion exchange group monomer and the second ion exchange group monomer. The third ion exchange group monomer can be configured to have a third charge at both the first pH and the second pH, where the third charge and the first charge both have the same polarity. The reaction mixture is polymerized to form the copolymer that is grafted to the support resin particles. The copolymer includes polymerized functional monomers that include the first ion exchange group monomer, the second ion exchange group monomer, and the third ion exchange group monomer.

In regards to the packing material made by any of the above methods, the reaction mixture has a mole percent for the first ion exchange group monomer can range from about 1% to about 20%, and a mole percent of a second ion exchange group monomer can range from about 30% to about 60%, and a mole percent of a third ion exchange group monomer can range from about 30% to about 60%. The mole percent for the first ion exchange group monomer is a mole amount of the first ion exchange group monomer divided by a summation of the mole amount of the first ion exchange group monomer, a mole amount of the second ion exchange group monomer, and a mole amount of the third ion exchange group monomer, and multiplied by 100. The mole percent for the second ion exchange group monomer is the mole amount of the second ion exchange group monomer divided by a summation of the mole amount of the first ion exchange group monomer, the mole amount of the second ion exchange group monomer, and the mole amount of the third ion exchange group monomer, and multiplied by 100. The mole percent for the third ion exchange group monomer is the mole amount of the third ion exchange group monomer divided by a summation of the mole amount of the first ion exchange group monomer, the mole amount of the second ion exchange group monomer, and the mole amount of the third ion exchange group monomer, and multiplied by 100.

In regards to the packing material made by any of the above methods, the mole percent for the first ion exchange group monomer is based on a first equation % $IEX_{1,mole}= [IEX_{1,mole}/(IEX_{1,mole}+IEX_{2,mole}+IEX_{3,mole})]\times 100$, where % $IEX_{1,mole}$ is the mole percent for the first ion exchange group monomer, $IEX_{1,mole}$ is the mole amount of the first ion exchange group monomer, $IEX_{2,mole}$ is the mole amount of the second ion exchange group monomer, and $IEX_{3,mole}$ is the mole amount of the third ion exchange group monomer. The mole percent for the second ion exchange group monomer is based on a second equation % $IEX_{2,mole}=[IEX_{2,mole}/(IEX_{1,mole}+IEX_{2,mole}+IEX_{3,mole})]\times 100$, where % $IEX_{2,mole}$ is the mole percent for the second ion exchange group monomer. The mole percent for the third ion exchange group monomer is based on a third equation % $IEX_{3,mole}=[IEX_{3,mole}/(IEX_{1,mole}+IEX_{2,mole}+IEX_{3,mole})]\times 100$, where % $IEX_{3,mole}$ is the mole percent for the third ion exchange group.

In regards to the packing material made by any of the above methods, the first ion exchange group monomer includes a styrene sulfonate, the second ion exchange group monomer includes a methacrylic acid, and the third ion exchange group monomer includes a vinylphosphonate.

A system for chromatographically separating a sample is described. The system includes a pump, an injection valve, a chromatography column, and a detector. The chromatography column includes any of the ion exchange chromatographic packing materials as described above.

A method of separating a sample is described. A mobile phase containing a plug of the sample is flowed into a chromatography column that includes any of the ion exchange chromatographic packing materials as described above. The sample is separated into one or more analyte bands in the chromatography column. The one or more analyte bands eluting off of the chromatography column are detected.

An ion exchange chromatographic packing material includes support resin particles; and a copolymer consists of or includes polymerized functional monomers that include a first ion exchange group monomer, a second ion exchange group monomer, and a third ion exchange monomer, where the first ion exchange group monomer, the second ion exchange group monomer, and the third ion exchange group monomer are each different. The copolymer is grafted to the support resin particles. The first ion exchange group monomer and the third ion exchange group monomer are each configured to have a first charge at a first pH, and the second ion exchange group monomer is configured to have a net neutral charge at the first pH. The first ion exchange group monomer and the third ion exchange group monomer are each configured to have the first charge at a second pH, and the second ion exchange group monomer is configured to have a net neutral charge or a second charge at the second pH where the first charge and second charge both have a same polarity, in which the first pH and the second pH are different.

In regards to any of the above packing materials, the first ion exchange group monomer, second ion exchange group monomer, and third ion exchange group monomer, each have a respective first, second, and third pKa values, where the first pKa is a smallest value of the first, second, and third pKa values, the second pKa is a largest value of the first, second, and third pKa values, and the third pKa is an intermediate value in between the first and second pKa values. In this embodiment, the packing material can be in the form of a cation exchange chromatographic packing material.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention (wherein like numerals represent like elements).

Figure 10:
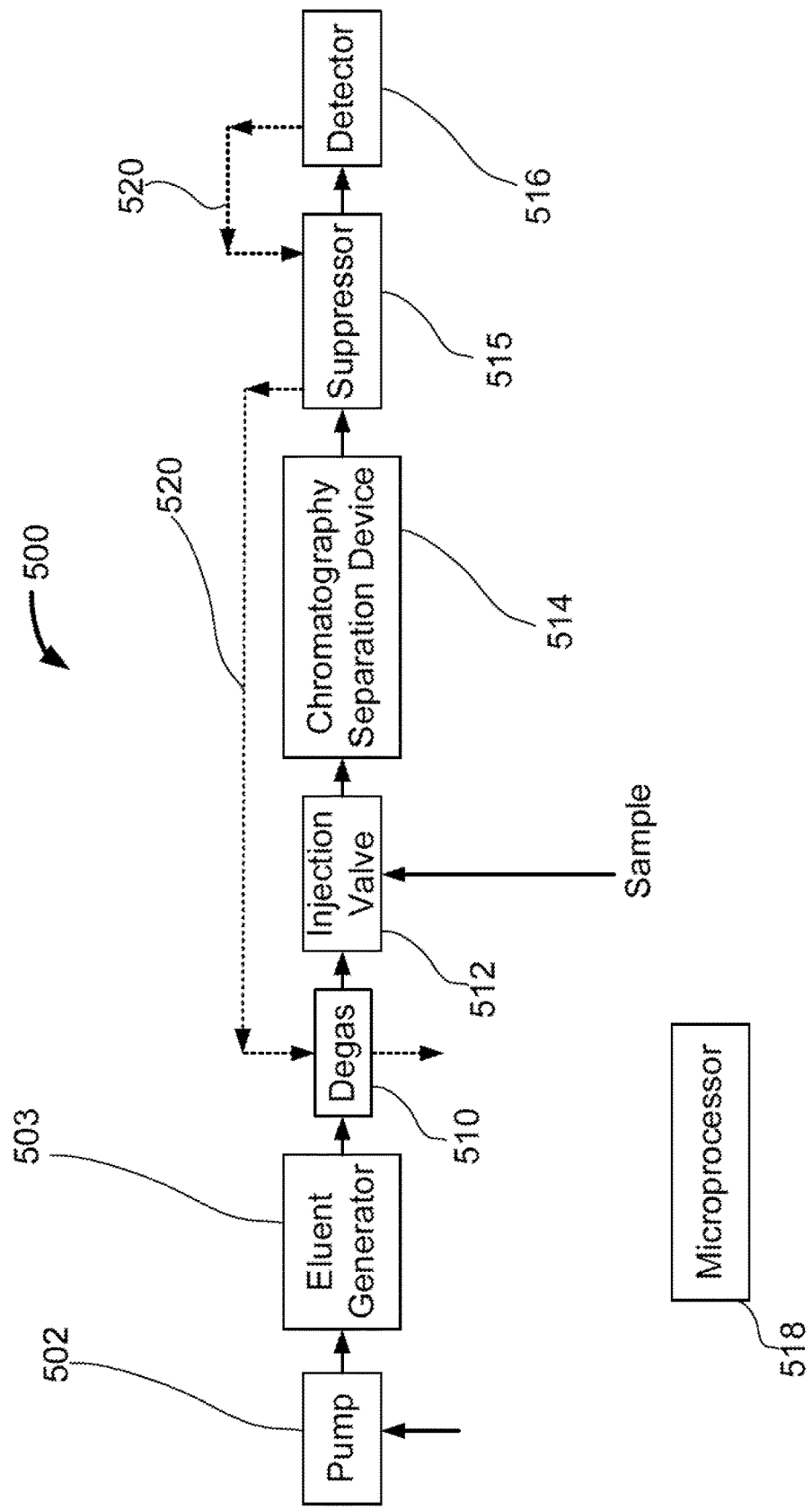

FIG. 10 shows a chromatography system suitable for analyzing ion standards with a chromatography column containing an ion exchange resin described herein.

DETAILED DESCRIPTION OF EMBODIMENTS

The following detailed description should be read with reference to the drawings, in which like elements in different drawings are identically numbered. The drawings, which are not necessarily to scale, depict selected embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. As used herein, the terms "about" or "approximately" for any numerical values or ranges indicate a suitable dimensional tolerance that allows the part or collection of components to function for its intended purpose as described herein.

Ion exchange resin capacity may be adjusted by decreasing or increasing the concentration of ion exchange groups in the resin. Such ion exchange resins may be prepared by using an ion exchange group monomer and a spacer monomer where the proportion of the two monomers is proportionally adjusted. Under certain circumstances, Applicant has found that increasing the concentration of spacer monomer to dilute the proportional concentration of the ion exchange groups above a particular threshold causes degradation in chromatographic performance of polyvalent ions. Assuming that the spacer monomer dilutes the ion exchange groups in a random manner, the resin will form with a finite proportion of two ion exchange sites being directly adjacent to one another. Whenever two ion exchange sites are directly adjacent, the retention of such sites for polyvalent ions will be much higher than other ion exchange sites where such ion exchange sites are further apart. The probability of two ion exchange sites being adjacent one another becomes lower as the proportion of the spacer monomer increases. In addition, the percentage of the total ion exchange sites decreases as the proportion of the spacer monomer increases. A problem with this situation is that the few sites that are adjacent to one another preferentially bind ions of higher valence (e.g., divalent). Once all of these adjacent ion exchange sites are occupied then polyvalent species are forced to occupy less retentive ion exchange sites where the ion exchange sites are further apart. This situation manifests as a stationary phase that is easily overloaded by polyvalent species even though the loading capacity for monovalent species is only modestly reduced. As a consequence, when using extreme dilution ratios, the working range of the stationary phases are typically too low to be commercially viable due to low efficiency for polyvalent species under all but extremely low analyte conditions.

In an embodiment, electrostatic repulsion can be used to minimize the probability of two retention sites being positioned adjacent to one another. An ion exchange monomer and spacer monomer can grafted to a substrate support particle where there is a high proportion of spacer monomer having a net neutral charge to electrostatically dilute the ion exchange monomer.

A spacer monomer with a net neutrally charged monomer can be a water soluble monomer that is highly hydrated under conditions of use to maintain good ion exchange kinetics. For example, zwitterionic monomers are typically highly hydrated and yet contribute to a relatively low retention for ionic analytes.

Another option is to polymerize the ion exchange group monomer in the presence of weakly acidic or weakly basic spacer monomers using reaction conditions that are sufficiently acidic in the case of weakly acidic monomers or sufficiently basic in the case of weakly basic monomers such that these monomers are essentially 100% non-ionic under the conditions of polymerization. Because charged ion exchange group monomers tend to repel one another, electrostatic repulsion reduces the probability of two fully ionic monomers reacting with one another. When such ion exchange group monomers are allowed to react in the presence of net neutrally charged monomers, the probability of fully ionized monomers reacting with one another is further diminished due to the fact that net neutrally charged monomers will experience no electrostatic repulsion and hence no inhibition of polymerization associated with the presence of a fully ionized monomer at the reactive end of the polymer chain. In order to increase the electrostatic repulsion of the ionic monomer, it is desirable to reduce the ionic strength of the polymerization solution. In an embodiment, a relatively low amount of acid or base can be used to suppress the ionization of weakly ionic spacer monomers or when using a zwitterionic spacer monomer by keeping the ionic strength to a low concentration. This can also be accomplished by using relatively low monomer concentrations for both the ion exchange group monomer and the spacer monomer having a net neutral charge in the graft solution.

In an embodiment of an ion exchange chromatographic packing material for cations, it includes styrene sulfonate and methacrylic acid. Note that ion exchange chromatographic packing material may also be referred to as ion exchange packing or ion exchange resin. The styrene sulfonate is a cation exchange group monomer that is fully ionic in water. The methacrylic acid is a spacer monomer having a net neutral charge when the carboxylate is protonated and dilutes the styrene sulfonate. The polymerization solution can contain added acid to suppress the ionization of the methacrylic acid. Note that the methacrylic acid monomer can be neutrally charged during the synthesis, but the carboxylic acid groups of this monomer can be neutral, partly ionized, and fully ionized during use in a chromatographic separation. The polymerization solution can also include support resin particles such as, for example, ethylvinylbenzene crosslinked with divinylbenzene. In another embodiment, the ion exchange chromatographic packing material can also include a third monomer in the polymerization solution such as, for example, vinylphosphonic acid.

A chromatography column containing a packed bed of an ion exchange chromatographic packing material is described. The column is a hollow tube made of a material such as a stainless steel, a polymer (e.g., polyetheretherketone, (PEEK)), or a stainless steel lined with PEEK. The ion exchange chromatographic packing material is typically packed into the hollow portion of the column. A frit and/or endcap fitting can be placed on both ends of the column to hold the packing in the column. The ion exchange chromatographic packing material can include support resin particles and a copolymer grafted to the support resin particle.

The copolymer includes polymerized functional monomers such as a first ion exchange group monomer and a second ion exchange group monomer. The first ion exchange group monomer and the second ion exchange group monomer are different. The first ion exchange group monomer can be either an anion exchange or a cation exchange monomer. The second ion exchange group monomer can be referred to as a spacer monomer. In an embodiment of a cation exchange chromatographic packing material, the first ion exchange group monomer can include a strong acid group with a pKa less than 3 and the second ion exchange group monomer can include a weak acid group with a pKa ranging from about 3 to about 5.

In an embodiment, the copolymer is grafted to the support resin particles and used as an ion exchange chromatography packing. During the polymerization of the first and second ion exchange group monomers, the copolymer may covalently bind to the support resin particle. In an embodiment, the support resin particle may contain ethylvinylbenzene crosslinked with divinylbenzene where there are residual alkene groups. This can allow the copolymer to graft to the support resin particles during the polymerization process.

At a first pH, the first ion exchange group monomer is configured to have a first charge (that is either a positive charge or negative charge). In contrast, the second ion exchange group monomer is configured to have a net neutral charge at the first pH. For example, the first ion exchange group can be a sulfonate (pKa of −2.8) and the second ion exchange group can be a carboxylate (pKa of +4.7). Where the first pH is between negative 1.8 and +3.7, the sulfonate groups will be negatively charged and the carboxylate groups will be neutrally charged.

At a second pH, the first ion exchange group monomer is configured to have the first charge and the second ion exchange group monomer is configured to have a second charge. Thus, the first ion exchange group monomer has the same charge at the first pH and second pH. At the second pH, the first charge and second charge both have a same polarity. It should be noted that the first pH and the second pH are different. Where the second pH is greater than about 5.7, the sulfonate groups and the carboxylate groups will both be negatively charged.

A mole percent of the second ion exchange group monomer (% $IEX_{2,mole}$) is a mole amount of the second ion exchange group monomer ($IEX_{2,mole}$) divided by a summation of a mole amount of the first ion exchange group monomer ($IEX_{1,mole}$) and the mole amount of the second ion exchange group monomer ($IEX_{2,mole}$), and multiplied by 100. In an embodiment, the mole percent of the second ion exchange group monomer ranges from about 60% to about 99%, preferably ranges from about 80% to about 99%, more preferably ranges from about 80% to about 95%, and yet more preferably ranges from about 90% to about 95%.

Applicant believes that the first ion exchange group monomer is diluted by the second ion exchange group monomer such that the copolymer contains a relatively low amount (e.g., 2%) or essentially no two adjacent first ion exchange group monomers. At a first pH, the second ion exchange group monomer has a net neutral charge allowing the charged first ion exchange group monomers to repel each other and in turn reduce the likelihood of two first ion exchange group monomers forming an adjacent bond. A small amount of acid can be added to ensure that the second ion exchange group monomer is protonated with a net neutral charge, but not in excess so that the electrostatic repulsion of the first ion exchange monomers is relatively strong.

In an embodiment, the polymerized functional monomers of the copolymer further include a third ion exchange group monomer. The third ion exchange group monomer is different from the first ion exchange group monomer and the second ion exchange group monomer. The third ion exchange group monomer is configured to have a third charge at both the first pH and the second pH, where the third charge and the first charge both have the same polarity.

A mole percent of the third ion exchange group monomer (% $IEX_{3,mole}$) is a mole amount of the third ion exchange group monomer ($IEX_{3,mole}$) divided by a summation of a mole amount of a first ion exchange group monomer ($IEX_{1,mole}$), a mole amount of the second ion exchange group monomer ($IEX_{2,mole}$), and the mole amount of the third ion exchange group monomer ($IEX_{3,mole}$), multiplied by 100. In an embodiment, the mole percent of the third ion exchange group monomer ranges from about 2% to about 48%, preferably ranges from about 2% to about 10%, and more preferably is about 5%.

The support resin particle can be any inert substrate particle that is suitable for grafting with an ion exchange copolymer provided that the support resin is chemically stable under the intended conditions of use. In an embodiment, the support resin particle may be based on a divinylbenzene crosslinking monomer and a support resin monomer where the support resin monomer may be an ethylvinylbenzene monomer, a styrene monomer, and a combination thereof. The support resin particles may have a diameter ranging from about 2 microns to about 20 microns, preferably from about 3 microns to about 10 microns, and more preferably from about 4 microns to about 7 microns. The support resin particles may have a surface area ranging from about 20 $m^2/g$ to about 800 $m^2/g$, preferably from about 400 $m^2/g$ to about 800 $m^2/g$, and more preferably from about 400 $m^2/g$ to about 500 $m^2/g$.

In an embodiment, the support resin particles include the divinylbenzene crosslinking monomer and the ethylvinylbenzene monomer. A mole percent of the divinylbenzene crosslinking monomer (% $DVB_{mole}$) is a mole amount of the divinylbenzene crosslinking monomer ($DVB_{mole}$) divided by a summation of the mole amount of the divinylbenzene crosslinking monomer ($DVB_{mole}$) and a mole amount of the mole, ethylvinylbenzene monomer ($EVB_{mole}$), and multiplied by 100. The mole percent of the divinylbenzene crosslinking monomer may range from about 30% to about 99%, and preferably be about 55%. Alternatively, the support particles may be based on other vinylaromatic monomers such as alpha-methylstyrene, chlorostyrene, chloromethylstyrene, vinyltoluene, vinylnaphthalene, and a combination thereof. The support particles may also be based on unsaturated monomers, and copolymers of the above vinylaromatic monomers and unsaturated monomers. Preferably such monomers will be copolymerized with a vinylaromatic crosslinking monomer such as divinylbenzene but other vinylaromatic crosslinking monomers such as trivinylbenzene, divinylnaphthalene, and a combination thereof may also be used.

In an embodiment, the first ion exchange group monomer and the second ion exchange group monomer each include a cation exchange group. In addition, the third ion exchange group monomer includes a cation exchange group. The first ion exchange group monomer may include a styrene sulfonate (4-vinyl benzenesulfonate), a vinyltoluenesulfonate, a 3-sulfopropyl methacrylate, a α-methylstyrenesulfonate, and a combination thereof. The second ion exchange group monomer may be a neutrally charged monomer, which includes a methacrylic acid, an acrylic acid, a 3-butenoic acid, a 4-vinylbenzoic acid, a 4-pentenoic acid, and a combination thereof. In another embodiment, the second ion exchange group monomer may be a zwitterionic monomer at the first pH, which includes a vinylbenzyldimethylbetaine, a 3-sulfopropyldimethyl-3-methacrylamidopropylammonium, a vinylbenzyldimethylsulfopropylammoniumbetaine, and a combination thereof. Where the second ion exchange group monomer is a zwitterionic monomer, it has a net neutral charge at both the first pH and the second pH. The third ion exchange group monomer may include a vinylphosphonate, a vinyl benzenephosphonate, and a combination thereof.

In an embodiment, the first ion exchange group monomer, second ion exchange group monomer, and third ion exchange group monomer each have a pKa where the pKa of the first ion exchange group has the smallest magnitude, the pKa of the second ion exchange group has the largest magnitude, and the pKa of the third ion exchange group is in between the pKa's of the first and second ion exchange groups. In an embodiment, the first, second, and third ion exchange group monomers may respectively be a sulfonate, a carbonate, and phosphonates, which have respective pKa values of about −2.8, +4.7, and +2.7.

In an embodiment, the first ion exchange group monomer and the second ion exchange group monomer may each include an anion exchange group. In addition, the third ion exchange group monomer may include an anion exchange group. The first anion exchange group monomer may include a wide variety of quaternary ammonium monomers such as, for example, the quaternary derivatives of vinylbenzylchloride, vinylbenzyl glycidyl ether, glycidylmethacrylate, glycidylacrylate, 2-bromoethyl acrylate, and a combination thereof. Such quaternary ammonium monomers include a vinylbenzyltrimethylammonium, a vinylbenzyldimethylethanolammonium, a 2-(N,N,N-trimethylamino)ethyl acrylate, a 2-(N,N,N-trimethylamino)ethyl methacrylate, and a combination thereof. The second anion exchange group monomer may include a wide variety of tertiary, secondary or primary amine monomers such as the amine derivatives of vinyl benzylchloride, vinylbenzyl glycidyl ether, glycidylmethacrylate, glycidylacrylate, 2-bromoethyl acrylate, and a combination thereof. Such amine monomers include a vinylbenzyldimethylamine, a vinylbenzylmethylethanolamine, a 2-(N,N-dimethylamino)ethyl acrylate, a 2-(N,N-dimethylamino)ethyl methacrylate, and a combination thereof. The second monomer may also include weakly basic aromatic monomers such as vinylpyridine. In another embodiment, the second ion exchange group monomer may be a zwitterionic monomer at the first pH, which includes a vinylbenzyldimethylbetaine, a 3-sulfopropyldimethyl-3-methacrylamidopropylammonium, a vinylbenzyldimethylsulfopropylammoniumbetaine, and a combination thereof. The third anion exchange group monomer may include a wide variety of amine monomers with a relatively high pKa such as amidine or guanidine derivatives of vinylbenzylchloride, vinylbenzyl glycidyl ether, glycidylmethacrylate, glycidylacrylate, 2-bromoethyl acrylate, and a combination thereof. Such amine monomers with a relatively high pKa include a vinylbenzyl derivative of acetamidine.

A method for making the ion exchange chromatographic packing material will be described. A first ion exchange group monomer, a second ion exchange group monomer, and an initiator in an aqueous liquid with support resin particles can be mixed together to form a reaction mixture where the first ion exchange group monomer and the second ion exchange group monomer are different. The reaction mixture is at a first pH where the first ion exchange group monomer has a first charge and the second ion exchange group monomer has a net neutral charge. The reaction mixture is polymerized to form a copolymer that is grafted to the support resin particles. The copolymer includes polymerized functional monomers such as the first ion exchange group monomer and the second ion exchange group monomer. At a second pH, the second ion exchange group monomer of the grafted support has a net neutral charge (when second ion exchange group monomer is zwitterionic) or a second charge where the first charge and the second charge have a same polarity. In this embodiment, the first pH and the second pH are different. The first ion exchange group monomer has the first charge at the first pH and the second pH.

In an embodiment for making a cation exchange chromatographic packing material, the reaction mixture is adjusted to a pH at least one unit less than the pKa of the second ion exchange group monomer and greater than the pKa of the first ion exchange group monomer. An acid may be added to the reaction mixtures to adjust the pH so that the second ion exchange group monomer has a net neutral charge. Methanesulfonic acid is an example of an acid suitable for use in the reaction mixture.

In an embodiment for making an anion exchange chromatographic packing material, the reaction mixture is adjusted to a pOH at least one unit less than the pKb of the second ion exchange group monomer and greater than the pKb of the first ion exchange group monomer. A base may be added to the reaction mixtures to adjust the pH so that the second ion exchange group monomer has a net neutral charge.

The reaction mixture may have a mole percent for the first ion exchange group monomer (% $IEX_{1,mole}$) that ranges from about 4% to about 20%, and a mole percent for the second ion exchange group monomer (% $IEX_{2,mole}$) that ranges from about 80% to about 96%. The mole percent for the first ion exchange group monomer (% $IEX_{1,mole}$) is the mole amount of the first ion exchange group monomer ($IEX_{1,mole}$) divided by a summation of the mole amount of the first ion exchange group monomer ($IEX_{1,mole}$) and a mole amount of the second ion exchange group monomer ($IEX_{2,mole}$), and multiplied by 100. The mole percent for the second ion exchange group monomer (% $IEX_{2,mole}$) is a mole amount of the second ion exchange group monomer ($IEX_{1,mole}$) divided by a summation of the mole amount of the first ion exchange group monomer (% $IEX_{1,mole}$) and a mole amount of the second ion exchange group monomer (% $IEX_{2,mole}$), and multiplied by 100.

Another method for making the ion exchange chromatographic packing material will be described that includes a third ion exchange monomer. Before the polymerizing step, a third ion exchange monomer is added to the reaction mixture to react with the first and second ion exchange monomers. The third ion exchange group monomer is different from the first ion exchange group monomer and the second ion exchange group monomer. The third ion exchange group monomer is configured to have a third charge at both the first pH and the second pH, where the third charge and the first charge both have the same polarity. The reaction mixture is polymerized to form the copolymer that is grafted to the support resin particles. The copolymer includes polymerized functional monomers, which are the first ion exchange group monomer, the second ion exchange group monomer, and the third ion exchange group monomer.

For the ion exchange chromatographic packing material with the first, second, and third ion exchange monomer, the reaction mixture may have a mole percent for the first ion exchange group monomer (% $IEX_{1,mole}$) that ranges from about 1% to about 20%, a mole percent for the second ion exchange group monomer (% $IEX_{2,mole}$) that ranges from about 30% to about 60%, a mole percent for the third ion exchange group monomer (% $IEX_{3,mole}$) that ranges from about 30% to about 60%. The mole percent for the first ion exchange group monomer (% $IEX_{1,mole}$) is a mole amount of a first ion exchange group monomer ($IEX_{1,mole}$) divided by a summation of the mole amount of the first ion exchange group monomer ($IEX_{1,mole}$), a mole amount of the second ion exchange group monomer ($IEX_{2,mole}$), and a mole amount of the third ion exchange group monomer ($IEX_{3,mole}$), and multiplied by 100. The mole percent for the second ion exchange group monomer (% $IEX_{2,mole}$) is a mole amount of a second ion exchange group monomer ($IEX_{2,mole}$) divided by a summation of the mole amount of the first ion exchange group monomer ($IEX_{1,mole}$), the mole amount of the second ion exchange group monomer ($IEX_{2,mole}$), and the mole amount of the third ion exchange group monomer ($IEX_{3,mole}$), and multiplied by 100. The mole percent for the third ion exchange group monomer (% $IEX_{3,mole}$) is a mole amount of a third ion exchange group monomer ($IEX_{2,mole}$) divided by a summation of the mole amount of the first ion exchange group monomer ($IEX_{1,mole}$), the mole amount of the second ion exchange group monomer ($IEX_{2,mole}$), and the mole amount of the third ion exchange group monomer ($IEX_{3,mole}$), and multiplied by 100. It should be noted that the mole percent ranges described in this paragraph refer to the reaction mixture and not the percentages actually incorporated in the copolymer. Applicant believes that when the first, second, and third ion exchange group monomers are styrene sulfonate, methacrylate, and vinylphosphonate, respectively, that the incorporation of the third ion exchange group vinylphosphonate is relatively low. For example, a reaction mixture with a 48 mole % for vinylphosphonate (% $IEX_{3,mole}$) may result in a copolymer incorporating a mole percent of about 2% to 10%.

Now that the ion exchange chromatographic packing material has been described, the following will describe a general chromatography system suitable for use with the chromatography columns described herein. FIG. 10 illustrates an embodiment of an ion chromatography system 500 that includes a pump 502, an electrolytic eluent generating device 503, a degas assembly 510, an injection valve 512, a chromatography separation device 514, a suppressor 515, a detector 516, and a microprocessor 518. A recycle line 520 may be used to transfer the liquid from an output of detector 516 to a regenerant portion of suppressor 515, and then to an inlet of degas assembly 510.

Pump 502 can be configured to pump a liquid from a liquid source and be fluidically connected to electrolytic eluent generating device 503. Electrolytic eluent generating device 503 is configured to generate an eluent such as for example KOH or methanesulfonic acid. Details regarding electrolytic eluent generating devices (e.g., eluent generator) can be found in U.S. Pat. Nos. 6,225,129 and 6,682,701, which are hereby incorporated by reference herein. In an embodiment, a residual gas may be carbon dioxide, hydrogen, and oxygen. The gas can be swept out of degas assembly 510 using a recycled liquid via a recycle line 520 that is downstream of detector 516. Injection valve 512 can be used to inject an aliquot of a liquid sample into an eluent stream. Chromatography separation device 514 (e.g., chromatography column) can be used to separate various matrix components present in the liquid sample from the analytes of interest. An output of chromatography separation device 514 can be fluidically connected to suppressor 515, and then to detector 516 to measure the presence of the separated chemical constituents of the liquid sample.

Suppressor 515 is a device used in ion chromatography to remove the eluent and sample counterions and replace them with regenerant ions. As a result, the eluent is converted to a weakly dissociated form prior to entering the detector. The suppressor allows analyte ions to be detected with a conductivity detector with a low background. Furthermore, the analytes can be converted to the more conductive acid or base form, which enhances the signal, particularly for fully dissociated species. Detail regarding suppressors can be found in U.S. Pat. Nos. 4,999,098; 6,328,885; and 8,415,168 which are hereby fully incorporated by reference herein.

Detector 516 may be in the form of ultraviolet-visible spectrometer, a fluorescence spectrometer, an electrochemical detector, a conductometric detector, a charge detector, or a combination thereof. Details regarding the charge detector that is based on a charged barrier and two electrodes can be found in US Pre-Grant Publication No. 20090218238, which is hereby fully incorporated by reference herein. For the situation where recycle line 520 is not needed, detector 516 may also be in the form of a mass spectrometer or a charged aerosol detector. The charged aerosol detector nebulizes the effluent flow and creates charged particles that can be measured as a current proportional to the analyte concentration. Details regarding the charged aerosol detector can be found in U.S. Pat. Nos. 6,544,484; and 6,568,245, which are hereby fully incorporated by reference herein.

An electronic circuit may include microprocessor 518 and a memory portion. Microprocessor 518 can be used to control the operation of chromatography system 500. Microprocessor 518 may either be integrated into chromatography system 500 or be part of a personal computer that communicates with chromatography system 500. Microprocessor 518 may be configured to communicate with and control one or more components of chromatography system such as pump 502, electrolytic eluent generating device 503, injection valve 512, and detector 516. Note that chromatography system 500 is a particular machine used to analyze standard solutions and sample solutions to identify chemical constituents and the associated concentration values.

Example 1—Synthesis of Styrene Sulfonic Acid (SSA) and Methacrylic Acid (MA) Copolymer with a 1:4 Weight Ratio of SSA:MA Support resin particles (2 grams of a copolymer of 45% ethylvinylbenzene and 55% divinylbenzene) were mixed thoroughly in deionized water (5 grams) to form a reaction mixture. The particles have a surface are of 450 meter$^2$/gram and 6-7 micron diameter. Next, methacrylic acid (2 grams) was added to the reaction mixture and mixed thoroughly. A solution was prepared with 0.5 grams sodium styrene sulfonate (also can be referred to as sodium 4-vinylbenzenesulfonate) with a prepared with 5 grams deionized water, added to the reaction mixture, and stirred for 5 minutes. 10 grams of deionized water and 1 gram of 0.1 molar methane sulfonic acid (MSA) were added to the reaction mixture. Next, a solution of 0.25 grams of 2,2'-azobis[2-(2-imidazolin-2-yl)propane]dihydrochloride (VA-044) in 5 grams of deionized water was then added to the reaction mixture. The reaction mixture was stirred at 50° C. for 16 hours. The reaction mixture was filtered, washed with deionized water, and then followed by 1 molar acetic acid. The filtered material was a copolymer of methacrylic acid (MA) and styrene sulfonic acid (SSA) grafted to the support resin particles.

Example 2—Synthesis of Styrene Sulfonic Acid (SSA) and Methacrylic Acid (MA) Copolymer with a 1:8 Weight Ratio of SSA:MA Support resin particles (5 grams of a copolymer of 45% ethylvinylbenzene and 55% divinylbenzene) were mixed thoroughly in deionized water (5 grams) to form a reaction mixture. The particles have a surface are of 450 meter$^2$/gram and 6-7 micron diameter. Next, methacrylic acid (4 grams) was added to the reaction mixture and mixed thoroughly. A solution was prepared with 0.5 grams sodium styrene sulfonate prepared with 10 grams deionized water, added to the reaction mixture, and stirred for 5 minutes. 25 grams of deionized water and 1 gram of 0.1 molar MSA were added to the reaction mixture. Next, a solution of 0.4 grams of 2,2'-azobis[2-(2-imidazolin-2-yl)propane]dihydrochloride (VA-044) in 5 grams of deionized water was then added to the reaction mixture. The reaction mixture was stirred at 50° C. for 16 hours. The reaction mixture was filtered, washed with deionized water, and then followed by 1 molar acetic acid. The filtered material was a copolymer of methacrylic acid (MA) and styrene sulfonic acid (SSA) grafted to the support resin particles.

Example 3—Synthesis of Methacrylic Acid (MA) and Vinylphosphonic Acid (VPA) Copolymer with a 1:1 Weight Ratio of MA:VPA Support resin particles (3 grams of a copolymer of 45% ethylvinylbenzene and 55% divinylbenzene) were mixed thoroughly in deionized water (3 grams) to form a reaction mixture. The particles have a surface are of 450 meter$^2$/gram and 6-7 micron diameter. Next, methacrylic acid (1.5 grams) and vinylphosphonic acid (1.5 grams) were added to the reaction mixture and mixed thoroughly. Next, 10 grams of deionized water was added to the reaction mixture and stirred for 2 minutes. A solution of 0.5 grams of 2,2'-azobis[2-(2-imidazolin-2-yl)propane]dihydrochloride (VA-044) in 3 grams of deionized water was then added to the reaction mixture. The reaction mixture was stirred at 50° C. for 16 hours. The reaction mixture was then diluted with 100 mL of 1M NaOH, filtered, and washed with deionized water, followed by 1M acetic acid. The resin was then washed with 50% Acetonitrile/50% 0.1M MSA, followed by 0.1M MSA. The filtered material was a copolymer of methacrylic acid (MA) and vinylphosphonic acid (VPA) grafted to the support resin particles.

Example 4—Synthesis of Methacrylic Acid (MA) and Vinylphosphonic Acid (VPA) Copolymer with a 1:3 Weight Ratio of MA:VPA Support resin particles (3 grams of a copolymer of 45% ethylvinylbenzene and 55% divinylbenzene) were mixed thoroughly in deionized water (3 grams) to form a reaction mixture. The particles have a surface are of 450 meter$^2$/gram and 6-7 micron diameter. Next, methacrylic acid (0.75 grams) and vinylphosphonic acid (2.225 grams) were added to the reaction mixture and mixed thoroughly. Next, 10 grams of deionized water was added to the reaction mixture and stirred for 2 minutes. A solution of 0.5 grams of 2,2'-azobis[2-(2-imidazolin-2-yl)propane]dihydrochloride (VA-044) in 3 grams of deionized water was then added to the reaction mixture. The reaction mixture was stirred at 50° C. for 16 hours. The reaction mixture was then diluted with 100 mL of 1M NaOH, filtered, and washed with deionized water, followed by 1M acetic acid. The resin was then washed with 50% Acetonitrile/50% 0.1M MSA, followed by 0.1M MSA. The filtered material was a copolymer of methacrylic acid (MA) and vinylphosphonic acid (VPA) grafted to the support resin particles.

Example 5—Synthesis of Styrene Sulfonic Acid (SSA), Methacrylic Acid (MA), and Vinylphosphonic Acid (VPA) Copolymer with a 0.28:1:1.23 Weight Ratio of SSA:MA:VPA Support resin particles (10 grams of a copolymer of 45% ethylvinylbenzene and 55% divinylbenzene) were mixed thoroughly in deionized water (10 grams) to form a reaction mixture. The particles have a surface are of 450 meter$^2$/gram and 6-7 micron diameter. Next, methacrylic acid (3 grams) and vinylphosphonic acid (3.7 grams) were added to the reaction mixture and mixed thoroughly. A solution was prepared with 0.83 grams sodium styrene sulfonate prepared with 10 grams deionized water, added to the reaction mix, and stirred for 5 minutes. 20 grams of deionized water was added to the reaction mixture, followed by a solution of 11.3 grams of 2,2'-azobis[2-(2-imidazolin-2-yl)propane]dihydrochloride (VA-044) in 40 grams of deionized water. The reaction mixture was stirred at 50° C. for 16 hours. The VPA is believed to provide sufficient acidity to the reaction mixture so that MA has a net neutral charge. The reaction mixture is then diluted with 0.1M sodium hydroxide (NaOH) (100 grams), stirred for 5 min, and filtered. The resin was then dispersed in 0.1 M NaOH and stirred at 70° C. for 4 hours. The reaction mixture was filtered and washed with deionized water. The resin is isolated and dispersed in 50% 0.2M Methanesulfonic acid (MSA)/50% Acetonitrile and stirred at 70° C. for 12-16 hrs. The dispersion was then filtered and washed with deionized water, followed by 1 molar acetic acid. The filtered material was a copolymer of methacrylic acid (MA), vinylphosphonic acid (VPA), styrene sulfonic acid (SSA) grafted to the support resin particles.

Example 6—Synthesis of Styrene Sulfonic Acid (SSA), Methacrylic Acid (MA), and Vinylphosphonic Acid (VPA) Copolymer with a 0.13:1:1.36 Weight Ratio of SSA:MA:VPA Support resin particles (10 grams of a copolymer of 45% ethylvinylbenzene and 55% divinylbenzene) were mixed thoroughly in deionized water (10 grams) to form a reaction mixture. The particles have a surface are of 450 meter$^2$/gram and 6-7 micron diameter. Next, methacrylic acid (3 grams) and vinylphosphonic acid (4.1 grams) were added to the reaction mixture and mixed thoroughly. A solution was prepared with 0.4 grams sodium styrene sulfonate prepared with 10 grams deionized water, added to the reaction mix, and stirred for 5 minutes. 20 grams of deionized water was added to the reaction mixture, followed by a solution of 11.3 grams of 2,2'-azobis[2-(2-imidazolin-2-yl)propane]dihydrochloride (VA-044) in 40 grams of deionized water. The reaction mixture was stirred at 50° C. for 16 hours. The reaction mixture is then diluted with 0.1 M sodium hydroxide (NaOH) (100 grams), stirred for 5 min, and filtered. The resin was then dispersed in 0.1 M NaOH and stirred at 70° C. for 4 hours. The reaction mixture was filtered and washed with deionized water. The resin is isolated and dispersed in 50% 0.2M Methanesulfonic acid (MSA)/50% Acetonitrile and stirred at 70° C. for 12-16 hrs. The dispersion was then filtered and washed with deionized water, followed by 1 molar acetic acid. The filtered material was a copolymer of methacrylic acid (MA), vinylphosphonic acid (VPA), styrene sulfonic acid (SSA) grafted to the support resin particles.

Example 7

Table 1 shows the monomer weight ratio, the monomer weight percentage, and the monomer mole ratio of the reaction mixtures for the resins of Examples 1 and 2.

TABLE 1

| SSA-MA graft | Monomer Weight Ratio | Monomer % Weight Ratio | Monomer Mole Ratio | Monomer % Mole Ratio |
|---|---|---|---|---|
| Resin lot | SSA:MA | SSA:MA | SSA:MA | SSA:MA |
| Example 1 | 1:4 | 20:80 | 1:9.6 | 9:91 |
| Example 2 | 1:8 | 11:89 | 1:19.2 | 5:95 |

The monomer weight ratio SSA:MA represents a weight of SSA: a weight of MA added to the reaction mixture.

The monomer percentage weight of MA represents the weight of MA in the reaction mixture divided by a summation of weights for MA and SSA together multiplied by 100. The monomer percentage of weight SSA represents the weight of SSA in the reaction mixture divided by a summation of MA and SSA together multiplied by 100. Note that the weight ratios herein are calculated for SSA using sodium 4-vinylbenzenesulfonate. The monomer mole ratios were calculated using a molecular weight of 86 grams/mole and 206 grams/mole for MA and SSA, respectively. The mole percent of MA can be calculated with an equation % $MA_{mole}=[MA_{mole}/(MA_{mole}+SSA)]\times 100$, where % $MA_{mole}$ is the mole percent of MA, $MA_{mole}$ is the mole amount of MA, and $SSA_{mole}$ is the mole amount of SSA. The mole percent of SSA can be calculated with an equation % $SSA_{mole}=[SA_{mole}/(MA_{mole}+SSA_{mole})]\times 100$, where % $SSA_{mole}$ is the mole percent of SSA.

Figure 1:
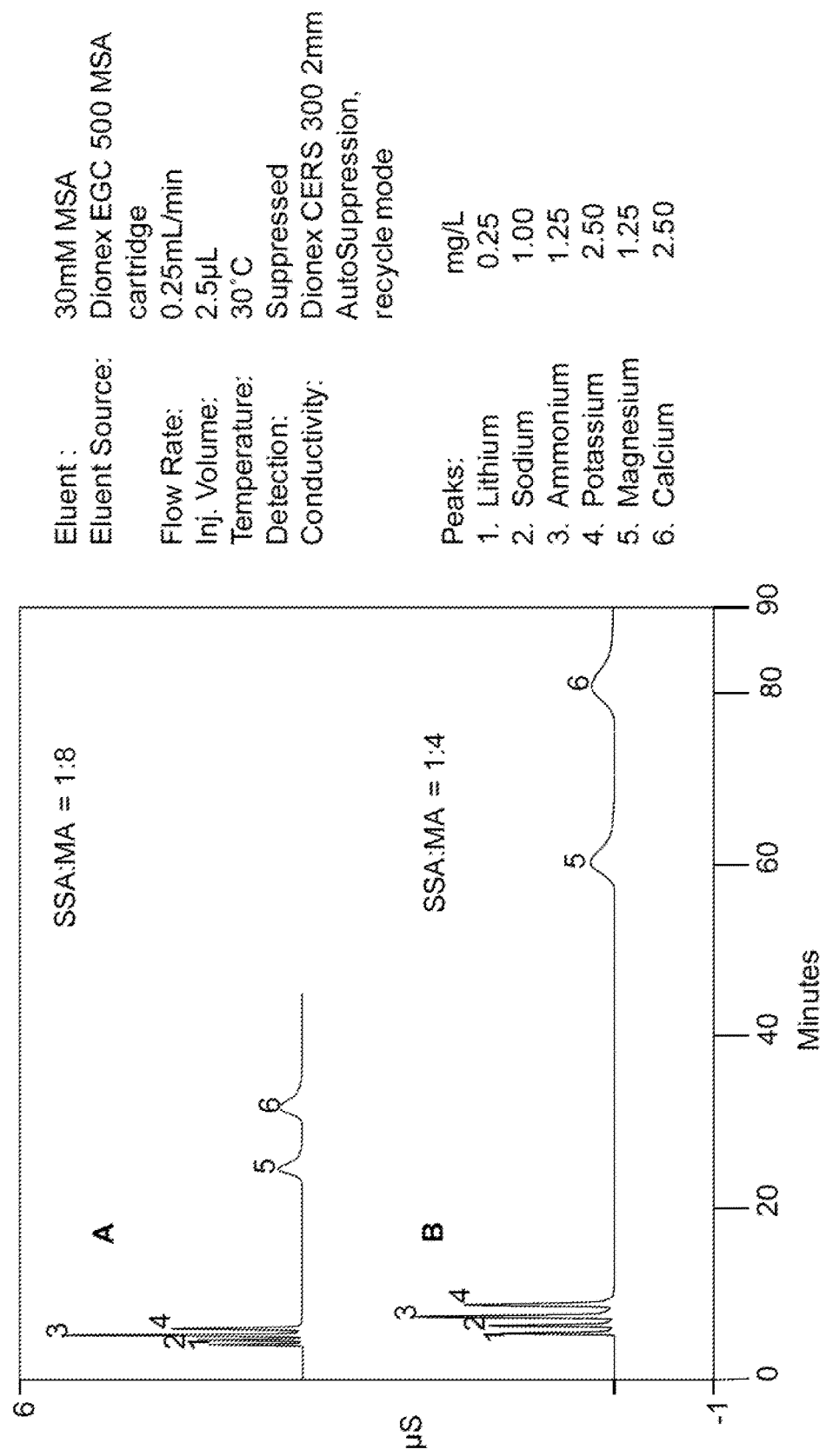
FIG. 1 shows two chromatograms of a cation standard solution using a chromatography column containing a copolymer resin that includes styrene sulfonic acid (SSA) and methacrylic acid (MA) at a SSA:MA 1:8 weight ratio (chromatogram A) or at a SSA:MA 1:4 weight ratio (chromatogram B). The cation standard solution contains 0.25 mg/L lithium (peak 1), 1.00 mg/L sodium (peak 2), 1.25 mg/L ammonium (peak 3), 2.50 mg/L potassium (peak 4), 1.25 mg/L magnesium (peak 5), and 2.5 mg/L calcium (peak 6).

The resin of Example 2 was packed into a chromatography column having an inner diameter of 2 millimeters and a length of 250 millimeters. This chromatography column was installed into an ion chromatography system (ICS-5000 commercially available from Thermo Fisher Scientific, Sunnyvale, Calif.) similar to FIG. 10. A pump was used to pump deionized water at a flow rate of about 0.25 mL/min. A Thermo Scientific Dionex capillary EGC 500 MSA cartridge (Thermo Fisher Scientific, Sunnyvale, Calif.) was used for generating MSA eluent at a constant 30 mM concentration (i.e., isocratic elution). A 2.5 μL injection volume of a six cation standard solution was injected into an injection valve. A column heater was used to maintain a column temperature of 30° C. The six cation standard solution contains lithium (0.25 mg/L), sodium (1.00 mg/L), ammonium (1.25 mg/L), potassium (2.50 mg/L), magnesium (1.25 mg/L), and calcium (2.50 mg/L). A Dionex CERS 300 suppressor was used with a 2 mm tubing inner diameter for autosuppression in the recycle mode. The detector 116 was a Thermo Scientific conductivity detector. Chromatogram A of FIG. 1 shows the separation of the 6 cation standard solution using a chromatography column containing the resin of Example 2.

The resin of Example 1 was also packed into a chromatography column and tested with a 6 cation standard solution in a manner similar to the chromatography column using the resin of Example 2. Chromatogram B of FIG. 1 shows the separation of the 6 cation standards solution using a chromatography column containing the resin of Example 1. For both chromatograms A and B of FIG. 1, peaks 1 through 6 respectively correspond to lithium, sodium, ammonium, potassium, magnesium, and calcium. Chromatograms A and B of FIG. 1 illustrate that all of the six cations can be chromatographically separated. In addition, chromatograms A and B of FIG. 1 indicate that the overall retention time of divalent ions increased with an increasing proportion of SSA Example 8

Table 2 shows the monomer weight ratio, the monomer weight percentage, and the monomer mole ratio of the reaction mixtures for the resins of Examples 3 and 4.

TABLE 2

| MA-VPA graft | Monomer Weight Ratio | Monomer % Weight Ratio | Monomer Mole Ratio | Monomer % Mole Ratio |
|---|---|---|---|---|
| Resin lot | MA:VPA | MA:VPA | MA:VPA | MA:VPA |
| Example 3 | 1:1 | 50:50 | 1:0.8 | 56:44 |
| Example 4 | 1:3 | 25:75 | 1:2.4 | 30:70 |

The monomer weight ratio MA:VPA represents a weight of MA: a weight of VPA added to the reaction mixture. The monomer percentage weight of MA represents the weight of MA in the reaction mixture divided by a summation of weights for MA and VPA together multiplied by 100. The monomer percentage weight of VPA represents the weight of VPA in the reaction mixture divided by a summation of weights for MA and VPA together multiplied by 100. The monomer mole ratios were calculated using a molecular weight of 108 grams/mole for VPA. The mole percent of MA can be calculated with an equation % $MA_{mole}=[MA_{mole}/(MA_{mole}+VPA_{mole})]\times 100$, where % $MA_{mole}$ is the mole percent of MA, $MA_{mole}$ is the mole amount of MA, and $VPA_{mole}$ is the mole amount of VPA. The mole of VPA can be calculated with an equation % $VPA_{mole}=[SA_{mole}/(MA_{mole}+VPA_{mole})]\times 100$, where % $VPA_{mole}$ is the mole percent of VPA.

Figure 2:
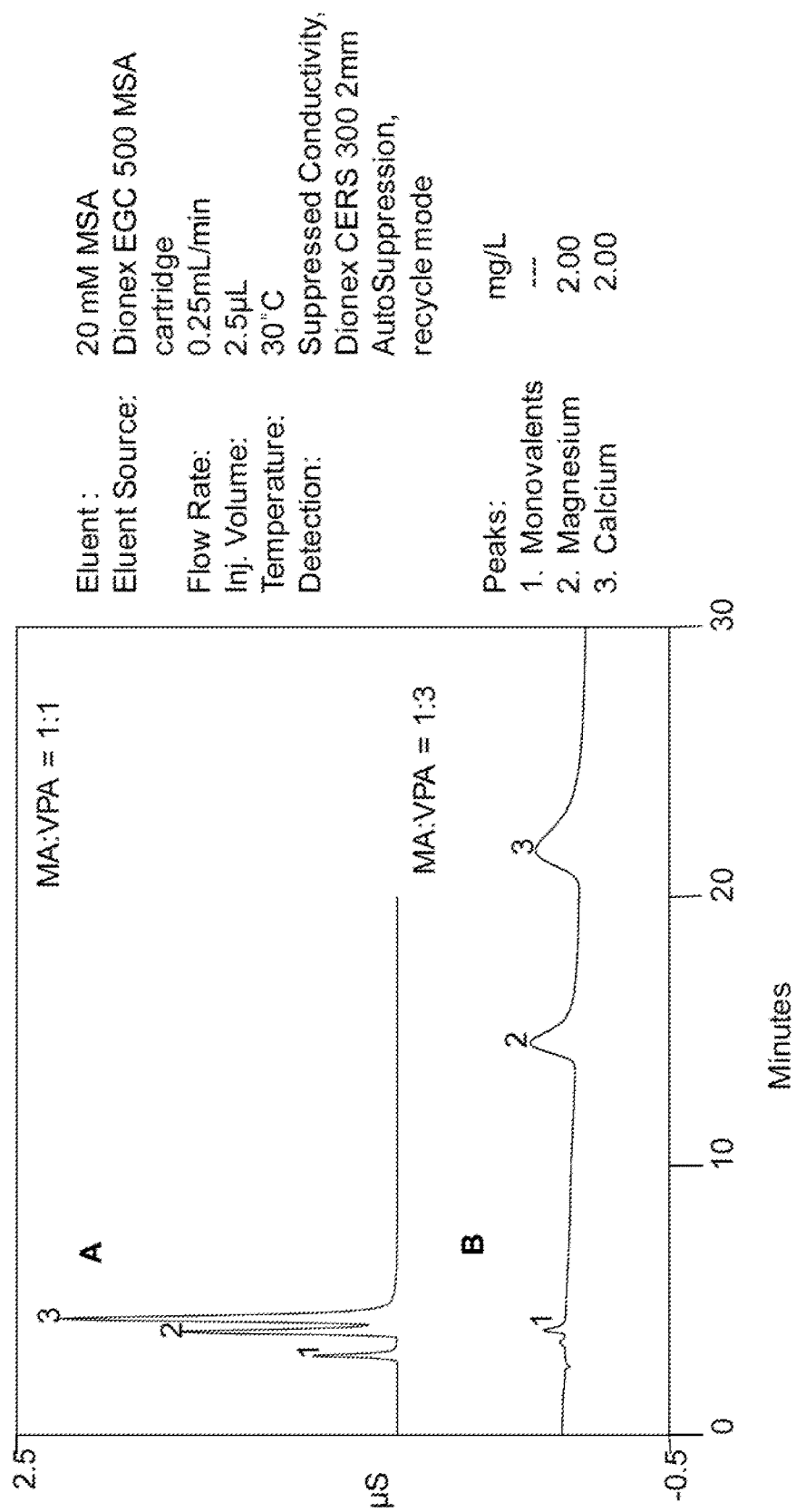
FIG. 2 shows two chromatograms of a cation standard solution using a chromatography column containing a copolymer resin that includes methacrylic acid (MA) and vinylphosphonic acid (VPA) at a MA:VPA 1:1 weight ratio (chromatogram A) or at a MA:VPA 1:3 weight ratio (chromatogram B). The cation standard solution contains residual monovalent ions (peak 1), 2.00 mg/L magnesium (peak 2), and 2.00 mg/L calcium (peak 3).

The resin of Example 3 was packed into a chromatography column and tested with a 6 cation standard solution in a manner similar to Example 7 except that a 20 mM MSA eluent was used. Chromatogram A of FIG. 2 shows the separation of the 6 cation standards solution using a chromatography column containing the resin of Examples 3 (MA:VPA=1:1). Similarly, the resin of Example 4 was packed into a chromatography column and tested with a 2 cation standard solution in a manner similar to Example 7. Chromatograms B of FIG. 2 shows the separation of the 2 cation standards solution using a chromatography column containing the resin of Example 4. The 2 cation standard solution contained a low residual amount of monovalent ions (e.g., sodium), 2.00 mg/L magnesium, and 2.00 mg/L calcium. For both chromatograms A and B of FIG. 2, peaks 1 through 3 respectively correspond to residual monovalent ions, magnesium, and calcium. Both chromatograms A and B of FIG. 2 show poor separation of the divalent ions. In chromatogram A, magnesium and calcium eluted in an area that overlaps with common monovalent metal ions. In chromatogram B, the magnesium and calcium peaks had a poor shape and low efficiency. The retention times of the divalent ions increased with an increasing proportion of VPA.

Example 9

Table 3 shows the monomer weight ratio, the monomer weight percentage, and the monomer mole ratio of the reaction mixtures for the resins of Examples 5 and 6.

TABLE 3

| MA-VPA-SSA graft | Monomer Weight Ratio | Monomer % Weight Ratio | Monomer Mole Ratio | Monomer % Mole Ratio |
|---|---|---|---|---|
| Resin lot | SSA:MA:VPA | SSA:MA:VPA | SSA:MA:VPA | SSA:MA:VPA |
| Example 5 | 0.28:1:1.23 | 11:40:49 | 0.1:1:1 | 6:48:47 |
| Example 6 | 0.13:1:1.36 | 5.2:40.1:54.6 | 0.06:1:1.1 | 3:47:51 |

The monomer weight ratio MA:SSA:VPA represents a weight of MA: a weight of SSA: a weight of VPA added to the reaction mixture. The monomer percentage of MA represents the weight of MA in the reaction mixture divided by a summation of weights for MA, VPA and SSA together multiplied by 100. The monomer weight percentage of VPA represents the weight of VPA in the reaction mixture divided by a summation of weights for MA, VPA, and SSA together multiplied by 100. The monomer weight percentage of SSA represents the weight of SSA in the reaction mixture divided by a summation of weights for MA, VPA, and SSA together multiplied by 100. The mole percent of MA can be calculated with an equation % $MA_{mole}=[MA_{mole}/(MA_{mole}+SSA_{mole}\ VPA_{mole})]\times 100$. The mole percent of SSA can be calculated with an equation % $SSA_{mole}=[SA_{mole}/(MA_{mole}+SSA_{mole}+VPA_{mole})]\times 100$, where % $SSA_{mole}$ is the mole percent of SSA. The mole percent of VPA can be calculated with an equation % $VPA_{mole}\ [VPA_{mole}/(MA_{mole}+SSA_{mole}+VPA_{mole})]\times 100$, where % $VPA_{mole}$ is the mole percent of VPA.

Figure 3:
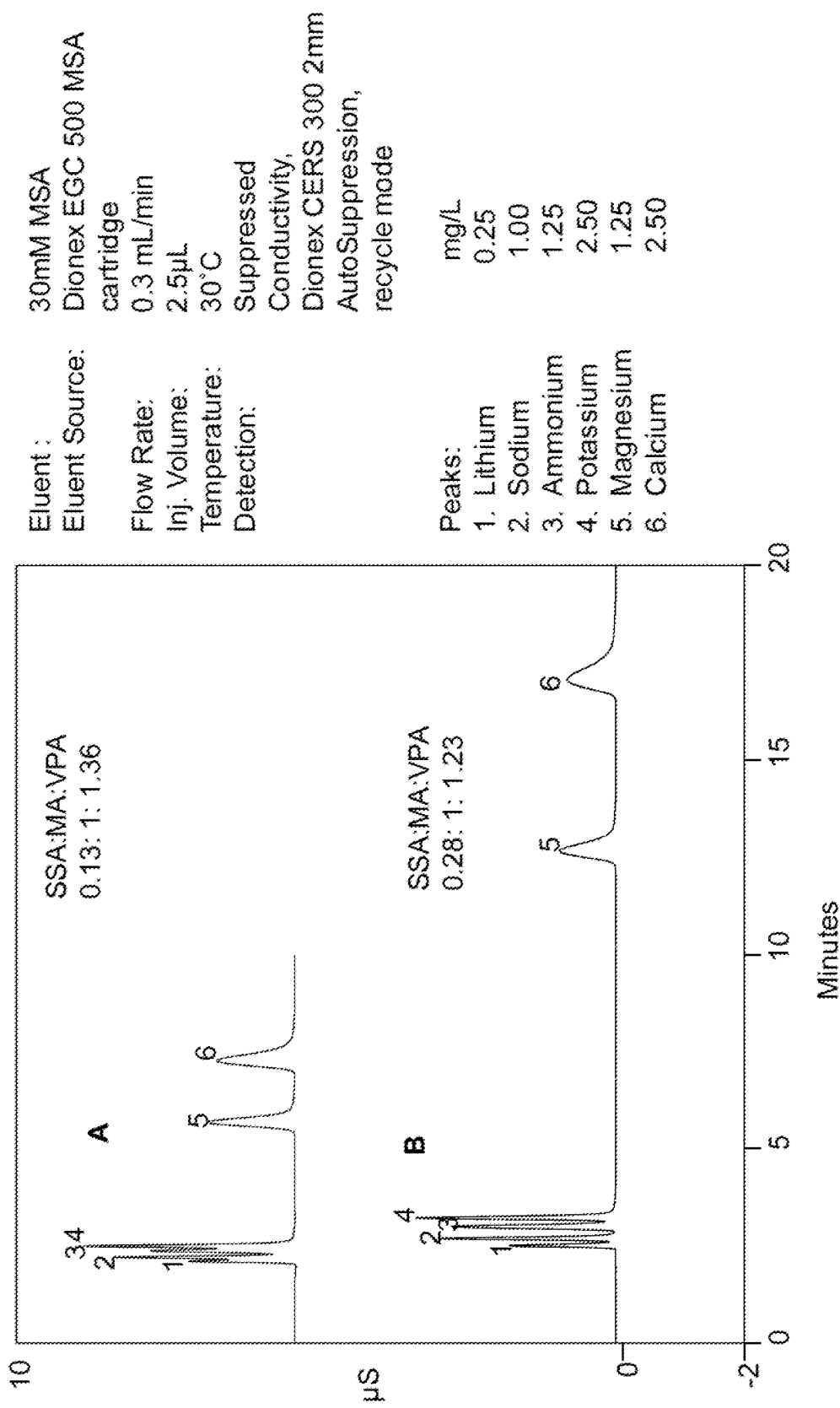
FIG. 3 shows two chromatograms of a cation standard solution using a chromatography column containing a copolymer resin that includes styrene sulfonic acid (SSA), methacrylic acid (MA), and vinylphosphonic acid (VPA) at a SSA:MA:VPA 0.13:1:1.36 weight ratio (chromatogram A) or at a SSA:MA:VPA 0.28:1:1.23 weight ratio (chromatogram B). The cation standard solution contains 0.25 mg/L lithium (peak 1), 1.00 mg/L sodium (peak 2), 1.25 mg/L ammonium (peak 3), 2.50 mg/L potassium (peak 4), 1.25 mg/L magnesium (peak 5), and 2.5 mg/L calcium (peak 6).

The resins of Example 5 and Example 6 were individually packed into separate chromatography columns and tested with a 6 cation standard solution in a manner similar to Example 7. Chromatogram A of FIG. 3 shows the separation of the 6 cation standards solution using a chromatography column containing the resin of Examples 6. Chromatograms B of FIG. 3 shows the separation of the 6 cation standards solution using a chromatography column containing the resin of Examples 6. For both chromatograms A and B of FIG. 3, peaks 1 through 6 respectively correspond to lithium, sodium, ammonium, potassium, magnesium, and calcium. Both Chromatograms A and B of FIG. 3 show good separation of the monovalent ions and also the divalent ions. In addition, there is a relatively large gap in retention time between the monovalent alkali metal ions and the divalent alkali earth metal ions. The overall retention times of the alkali earth ions increased with an increased proportion of SSA. Given the relatively poor separation results using VPA in Examples 5 to 7, Applicant surprisingly found that the addition of PVA to a reaction mixture of MA and SSA generated chromatographic material with improved separation of monovalent and divalent ions and improved peak efficiency values. Without wishing to be bound by a particular theory, the VPA has an intermediate pKa in between the pKa's of MA and SSA and this may create a more hydrated copolymer with extended structure grafted to the support resin particles, which improves cation exchange kinetics for chromatographic separations. In addition, the chromatographic materials containing either SSA/NA or SSA/MA/PVA were found to be stable to being washed in organic solvents such as for example up to 100% acetonitrile.

Example 10

Table 4 shows a summary of chromatographic performance of a copolymer containing SSA, MA, and VPA.

TABLE 4

| Resin of Example 5 - SSA:MA:VPA = 0.28:1:1.23 | | | | |
|---|---|---|---|---|
| No. | Peakname | Ret. Time-Minutes | Plates (EP) | Asymmetry (EP) | Resolution (EP) |
| 1 | Lithium | 2.51 | 6112 | n.a. | 1.42 |
| 2 | Sodium | 2.70 | 6824 | 1.15 | 1.94 |
| 3 | Ammonium | 3.00 | 4130 | n.a. | 1.36 |
| 4 | Potassium | 3.23 | 7636 | n.a. | 22 |
| 5 | Magnesium | 12.65 | 5068 | 1.41 | 5.04 |
| 6 | Calcium | 17.04 | 4346 | 1.69 | n.a. |

Table 5 shows a summary of chromatographic performance of a copolymer containing SSA and MA.

TABLE 5

| Resin of Example 2 - SSA:MA = 1:8 | | | | |
|---|---|---|---|---|
| No. | Peakname | Ret. Time-Minutes | Plates (EP) | Asymmetry (EP) | Resolution (EP) |
| 1 | Lithium | 4.06 | 3937 | 1.07 | 1.96 |
| 2 | Sodium | 4.59 | 4179 | 1.07 | 1.77 |
| 3 | Ammonium | 5.16 | 3166 | 1.09 | 2.03 |
| 4 | Potassium | 5.90 | 4157 | 1.15 | 13.8 |
| 5 | Magnesium | 24.50 | 1759 | 1.36 | 2.69 |
| 6 | Calcium | 31.69 | 1764 | 1.39 | n.a. |

The number of plates were about 50% to about 100% larger for the copolymer containing SSA, MA, and VPA compared to the other copolymer containing MA and SSA indicating that the MA, VPA, and SSA resin performed better than the MA and SSA resin for separating cations.

Example 11

Figure 4:
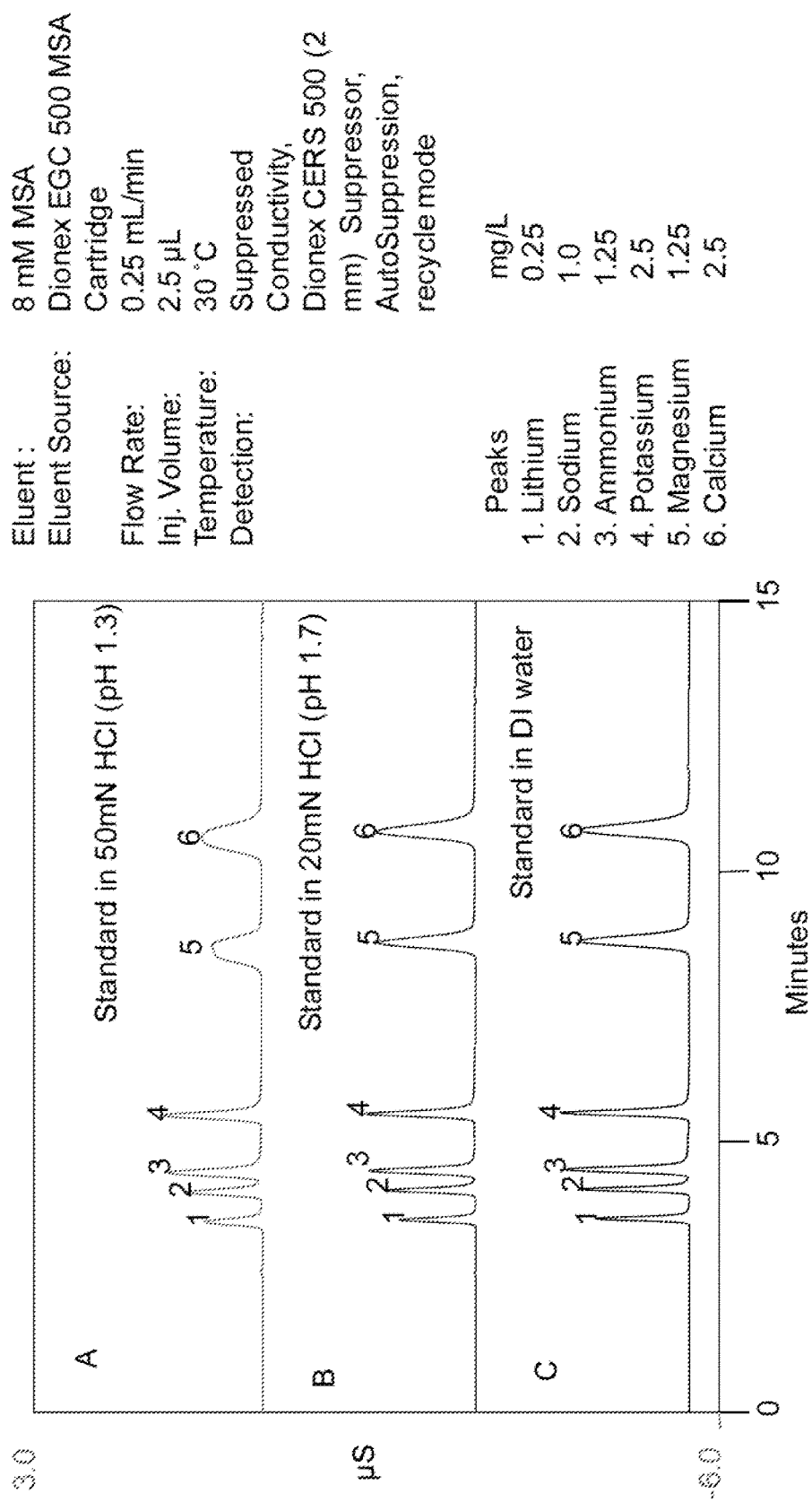
FIG. 4 shows three chromatograms using a chromatography column containing a resin based on carboxylate cation exchange groups. A cation standard solution was injected that was prepared with 50 mN HCl at pH 1.3 (chromatogram A), 20 mN HCl at pH 1.7 (chromatogram B), or deionized water (chromatogram C). The cation standard solution contains 0.25 mg/L lithium (peak 1), 1.00 mg/L sodium (peak 2), 1.25 mg/L ammonium (peak 3), 2.50 mg/L potassium (peak 4), 1.25 mg/L magnesium (peak 5), and 2.5 mg/L calcium (peak 6).

A chromatography column containing a resin based on carboxylate cation exchange groups with a cation standard solution was tested in a manner similar to Example 7 except that an 8 mM MSA eluent was used. Three chromatograms were run that tested a cation standard prepared with 50 mN HCl at pH 1.3 (chromatogram A), 20 mN HCl at pH 1.7 (chromatogram B), or deionized water (chromatogram C) as illustrated in FIG. 4. The cation standard solution contained 0.25 mg/L lithium, 1.00 mg/L sodium, 1.25 mg/L ammonium, 2.50 mg/L potassium, 1.25 mg/L magnesium, and 2.5 mg/L calcium. For chromatograms A, B, and C of FIG. 4, peaks 1 through 6 respectively correspond to lithium, sodium, ammonium, potassium, magnesium, and calcium. Chromatograms A, B, and C of FIG. 4 show separation of monovalent and divalent ions. However, the divalent ions show significant degradation in peak shape when the standard cation solution was in 50 mN HCl. Comparing deionized water to 20 mN HCl in the cation standard, there was a 19% drop in efficiency for lithium and a 15% drop in efficiency for sodium, and a 9% drop in efficiency for ammonium ion. Based on a >10% efficiency loss criteria, 20 mN HCl causes significant degradation in chromatographic performance, and 50 mN HCl causes even more significant degradation in chromatographic performance.

Example 12

Figure 5:
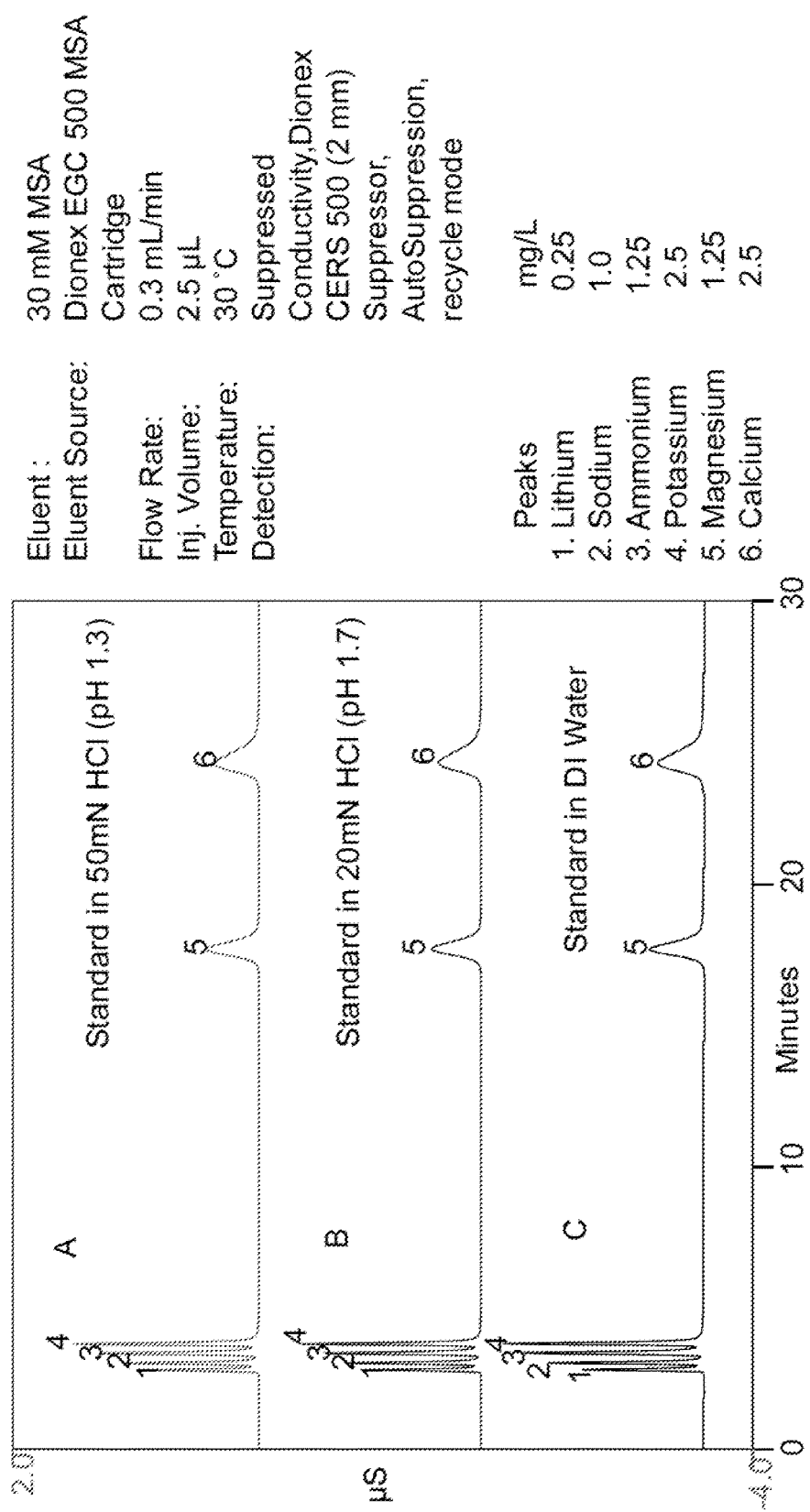
FIG. 5 shows three chromatograms using a chromatography column containing a resin based on a combination of sulfonate, carboxylate, and phosphonates cation exchange groups. A cation standard solution was injected that was prepared with or 50 mN HCl at pH 1.3 (chromatogram A), 20 mN HCl at pH 1.7 (chromatogram B), or deionized water (chromatogram C). The cation standard solution contains 0.25 mg/L lithium (peak 1), 1.00 mg/L sodium (peak 2), 1.25 mg/L ammonium (peak 3), 2.50 mg/L potassium (peak 4), 1.25 mg/L magnesium (peak 5), and 2.5 mg/L calcium (peak 6).

A chromatography column containing a resin of Example 5 based on a combination of sulfonate, carboxylate, and phosphonates cation exchange groups was tested with a cation standard solution in a manner similar to Example 7. Three chromatograms were run that tested a cation standard prepared with 50 mN HCl at pH 1.3 (chromatogram A), 20 mN HCl at pH 1.7 (chromatogram B), or deionized water (chromatogram C) as illustrated in FIG. 5. The cation standard solution contained 0.25 mg/L lithium, 1.00 mg/L sodium, 1.25 mg/L ammonium, 2.50 mg/L potassium, 1.25 mg/L magnesium, and 2.5 mg/L calcium. For chromatograms A, B, and C of FIG. 5, peaks 1 through 6 respectively correspond to lithium, sodium, ammonium, potassium, magnesium, and calcium. Chromatograms A, B, and C of FIG. 5 show good separation of monovalent and divalent ions. However, in contrast to chromatogram A of FIG. 4, chromatogram A of FIG. 5 does not show a significant degradation in peak shape for the divalent ions when the standard cation solution was in 50 mN HCl. Comparing deionized water to 20 mN HCl in the cation standard, there was less than a 2% drop in efficiency for all of the cations. Comparing deionized water to 50 mN HCl in the cation standard, there was less than an 11% drop in efficiency for lithium and the other cations had less than a 10% drop in efficiency. Thus, the resin of Example 5 is much more robust to cation samples having relatively high acid concentrations compared to the carboxylate based resin tested in Example 11.

Example 13

Figure 6:
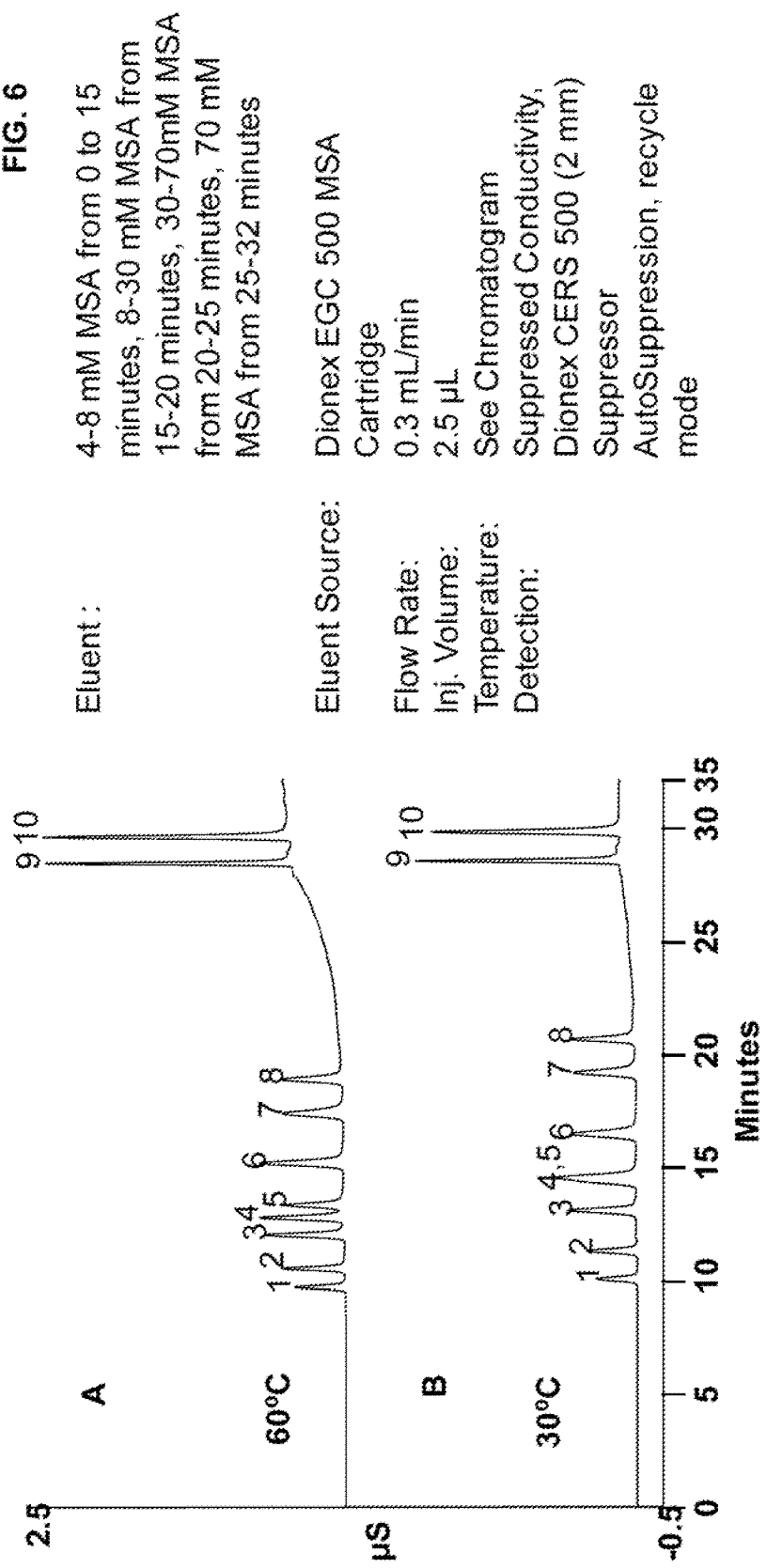
FIG. 6 shows two chromatograms using a gradient elution at a temperature of 60° C. (chromatogram A) and 30° C. (chromatogram B) with a chromatography resin based on a combination of sulfonate, carboxylate, and phosphonates cation exchange groups. The cation standard solution includes alkali metals, alkali earth metals, ammonium, and various alkyl amines, which are 0.25 mg/L lithium (peak 1), 1.00 mg/L sodium (peak 2), 1.25 mg/L ammonium (peak 3), 2.50 mg/L potassium (peak 4), 1.25 mg/L methylamine (peak 5), 5.0 mg/L dimethylamine (peak 6), 10.0 mg/L trimethylamine (peak 7), 5.0 mg/L tetramethylammonium (peak 8), 1.25 mg/L magnesium (peak 9), and 2.5 mg/L calcium (peak 10).

A chromatography column containing a resin of Example 5 based on a combination of sulfonate, carboxylate, and phosphonates cation exchange groups was tested with a cation standard solution that contains alkali metals, alkali earth metals, ammonium ion, and various alkyl amines. In this Example, chromatograms A and B of FIG. 6 were performed at 60° C. and 30° C., respectively. The chromatographic conditions were similar to Example 7 except that a gradient elution was used. The MSA eluent increased linearly from 4-8 mM MSA from 0 to 15 minutes, 8-30 mM MSA from 15-20 minutes, 30-70 mM MSA from 20-25 minutes, and 70 mM MSA from 25-32 minutes. The cation standard solution contained 0.25 mg/L lithium, 1.00 mg/L sodium, 1.25 mg/L ammonium, 2.50 mg/L potassium, 1.25 mg/L methylamine, 5.0 mg/L dimethylamine, 10.0 mg/L trimethylamine, 5.0 mg/L tetramethylammonium, 1.25 mg/L magnesium, and 2.5 mg/L calcium and these aforementioned cations respectively correspond to peaks 1 to 10 for chromatograms A and B of FIG. 6. Both Chromatograms A and B of FIG. 6 show good separation of the alkali metals, alkali earth metals, ammonium, and various alkyl amines. Applicant notes that, when using the resin of Example 5 with a gradient elution, the alkyl amine compounds tend to elute in between the monovalent alkali metal ions and the divalent alkali earth metal ions. This allows for monovalent alkali metal ions, divalent alkali earth metal ions, and amines to be separated in a single chromatogram, which can save time as opposed to running two or more chromatograms with one or more columns. In addition, there is a good separation between the sodium (peak 2) and ammonium ion (peak 3) allowing for ammonium ion to be analyzed in the presence of a relatively high sodium concentration. Depending on the particular cations that need to be analyzed, a user can vary the column temperature to increase the resolution of the relevant peaks. For example, potassium (peak 4) and methylamine (peak 5) illustrate separate peaks at 60° C. and overlap at 30° C.

Example 14

Figure 7:
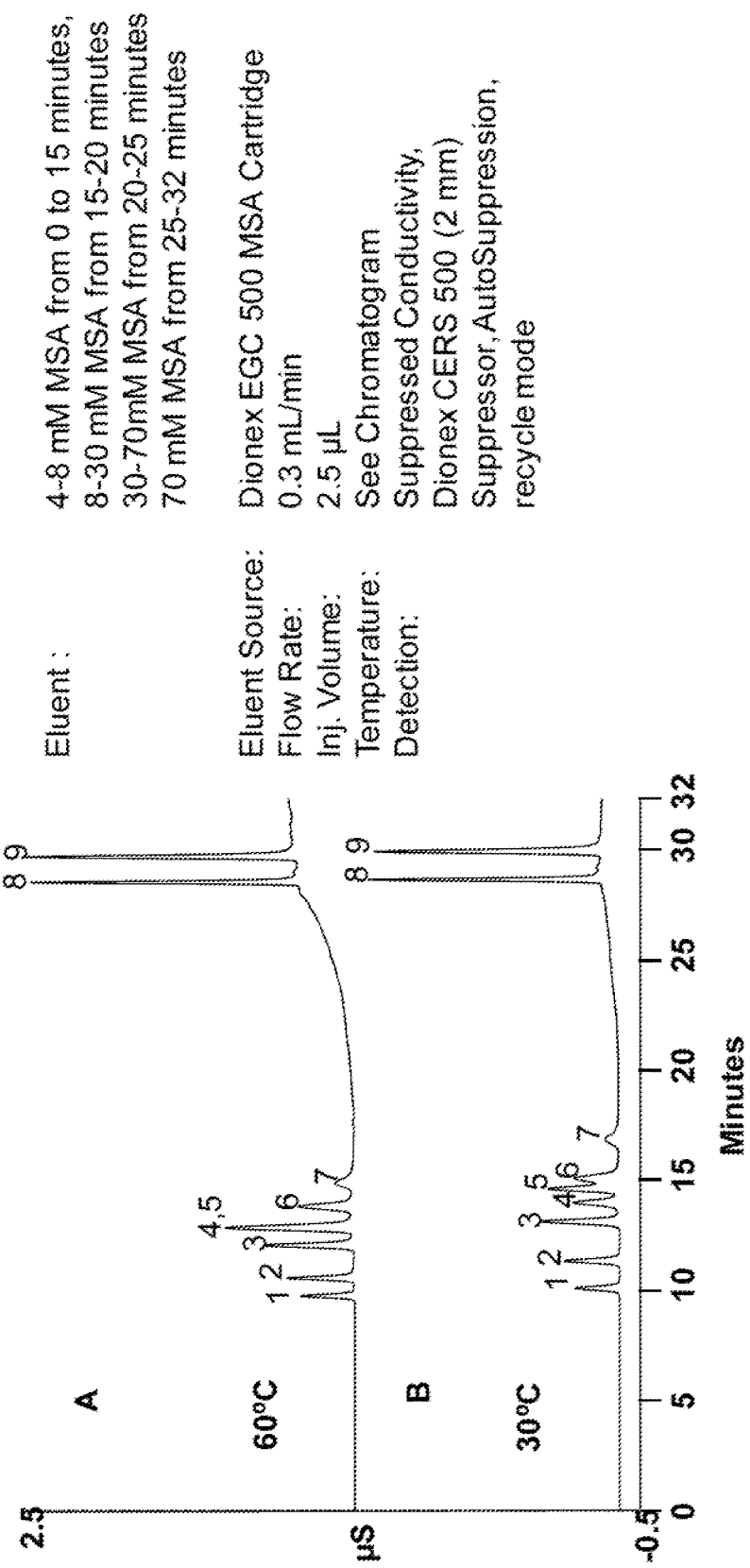
FIG. 7 shows two chromatograms using a gradient elution at a temperature of 60° C. (chromatogram A) and 30° C. (chromatogram B) with a chromatography resin based on a combination of sulfonate, carboxylate, and phosphonates cation exchange groups. The cation standard solution contains alkali metals, alkali earth metals, ammonium, and various hydroxy alkyl amines, which are 0.25 mg/L lithium (peak 1), 1.00 mg/L sodium (peak 2), 1.25 mg/L ammonium (peak 3), 1.25 mg/L ethanolamine (peak 4), 2.50 mg/L potassium (peak 5), 5.0 mg/L diethanolamine (peak 6), 10 mg/L triethanolamine (peak 7), 1.25 mg/L magnesium (peak 8), and 2.5 mg/L calcium (peak 9).

A chromatography column containing a resin of Example 5 based on a combination of sulfonate, carboxylate, and phosphonates cation exchange groups was tested with a cation standard solution that contains alkali metals, alkali earth metals, ammonium, and various hydroxy alkyl amines. In this Example, chromatograms A and B of FIG. 7 were performed at 60° C. and 30° C., respectively. The chromatographic conditions were similar to Example 13. The cation standard solution contained 0.25 mg/L lithium, 1.00 mg/L sodium, 1.25 mg/L ammonium, 1.25 mg/L ethanolamine, 2.50 mg/L potassium, 5.0 mg/L diethanolamine, 10 mg/L triethanolamine, 1.25 mg/L magnesium, and 2.5 mg/L calcium and these aforementioned cations respectively correspond to peaks 1 to 9 for chromatograms A and B of FIG. 7. Both Chromatograms A and B of FIG. 7 show good separation of the alkali metals, alkali earth metals, ammonium, and various hydroxy alkyl amines. Depending on the particular cations that need to be analyzed, a user can vary the column temperature to increase the resolution of the relevant peaks. For example, ethanolamine (peak 4) and potassium (peak 5) illustrate separate peaks at 30° C. and overlap at 60° C.

Example 15

Figure 8:
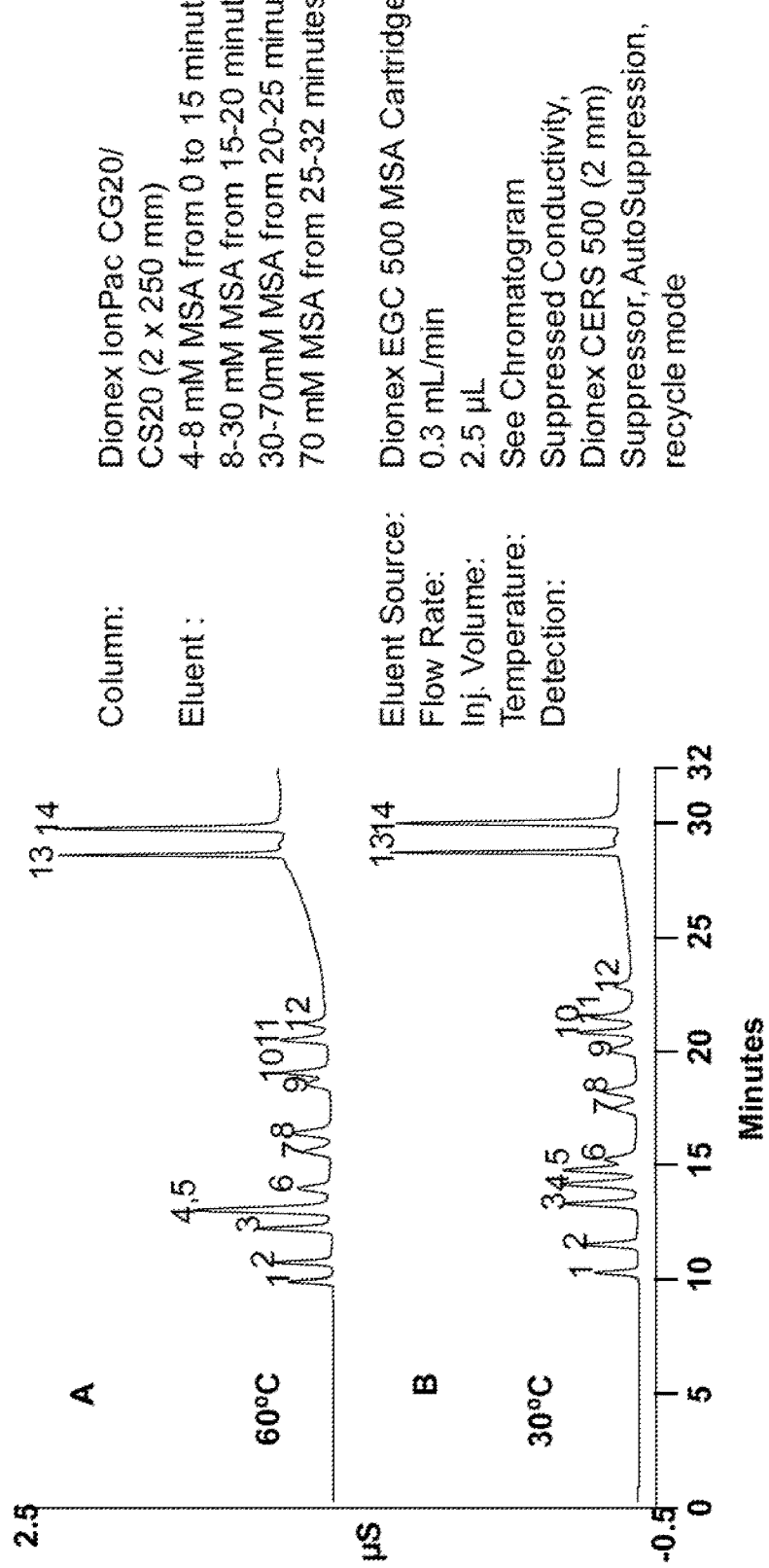
FIG. 8 shows two chromatograms using a gradient elution at a temperature of 60° C. (chromatogram A) and 30° C. (chromatogram B) with a chromatography resin based on a combination of sulfonate, carboxylate, and phosphonates cation exchange groups. The cation standard solution includes alkali metals, alkali earth metals, ammonium, various alkyl amines, and various hydroxy alkyl amines, which are 0.25 mg/L lithium (peak 1), 1.00 mg/L sodium (peak 2), 1.25 mg/L ammonium (peak 3), 1.25 mg/L ethanolamine (peak 4), 2.50 mg/L potassium (peak 5), 5.0 mg/L diethanolamine (peak 6), 5.0 mg/L N-methyldiethanolamine (peak 7), 5.0 mg/L dimethyl-ethanolamine (peak 8), 5.0 mg/L diisopropanolamine (peak 9), 5 mg/L tetramethylammonium (peak 10), 5.0 mg/L diethylamine (peak 11), 5.0 mg/L diethylaminoethanol (peak 12), 1.25 mg/L magnesium (peak 13), and 2.5 mg/L calcium (peak 14).

A chromatography column containing a resin of Example 5 based on a combination of sulfonate, carboxylate, and phosphonates cation exchange groups was tested with a cation standard solution that contains alkali metals, alkali earth metals, ammonium, various alkyl amines, and various hydroxy alkyl amines. In this Example, chromatograms A and B of FIG. 8 were performed at 60° C. and 30° C., respectively. The chromatographic conditions were similar to Example 13. The cation standard solution contained 0.25 mg/L lithium, 1.00 mg/L sodium, 1.25 mg/L ammonium, 1.25 mg/L ethanolamine, 2.50 mg/L potassium, 5.0 mg/L diethanolamine, 5.0 mg/L N-methyldiethanolamine, 5.0 mg/L dimethyl-ethanolamine, 5.0 mg/L diisopropanolamine, 5 mg/L tetramethylammonium, 5.0 mg/L diethylamine, 5.0 mg/L diethylaminoethanol, 1.25 mg/L magnesium, and 2.5 mg/L calcium and these aforementioned cations respectively correspond to peaks 1 to 14 for chromatograms A and B of FIG. 8. Both Chromatograms A and B of FIG. 8 show good separation of the alkali metals, alkali earth metals, ammonium, and various hydroxy alkyl amines. Depending on the particular cations that need to be analyzed, a user can vary the column temperature to increase the resolution of the relevant peaks. For example, ethanolamine (peak 4) and potassium (peak 5) illustrate separate peaks at 30° C. and overlap at 60° C. Also diisopropanolamine (peak 9) and tetramethylammonium (peak 10) illustrate separate peaks at 30° C. and overlap at 60° C.

Example 16

Figure 9:
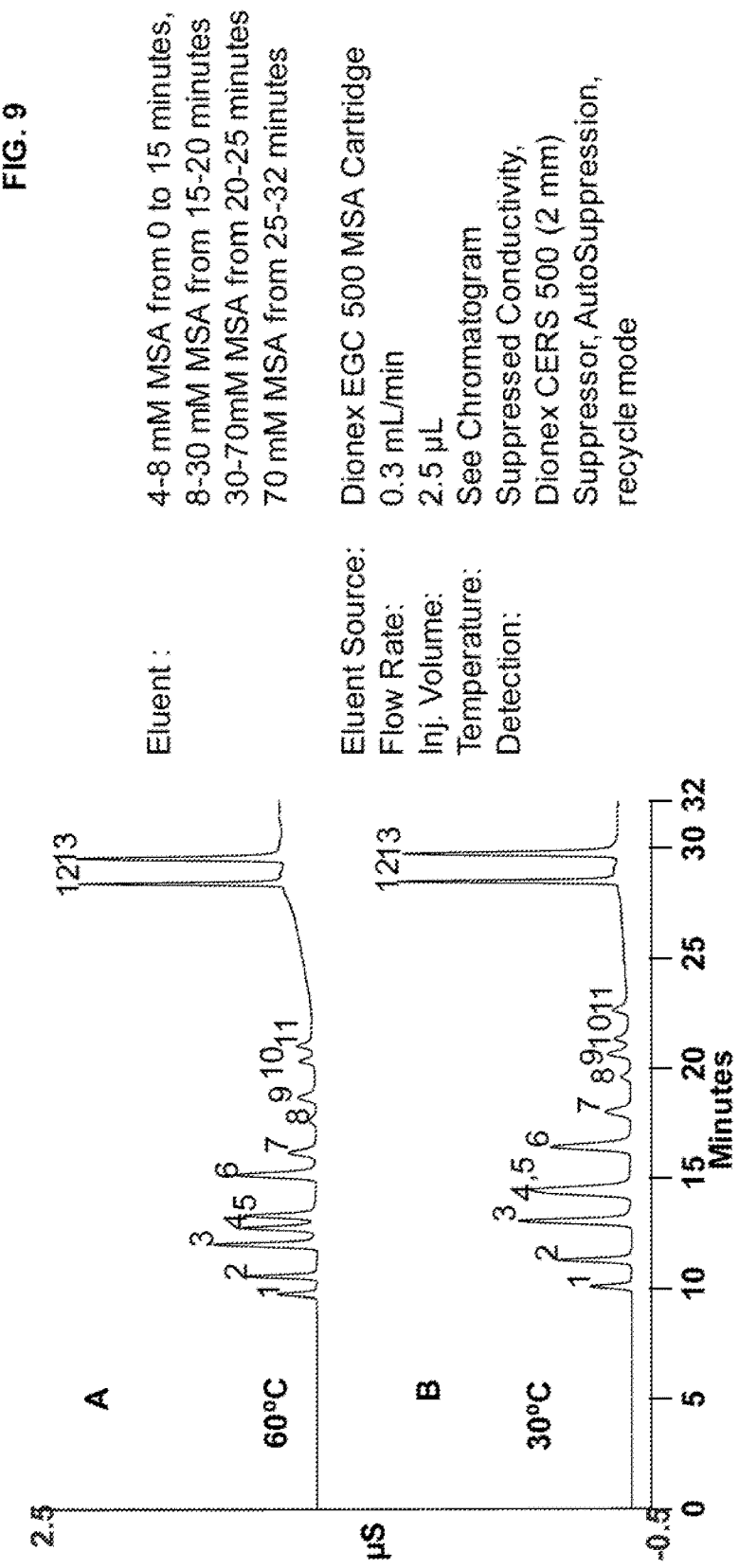
FIG. 9 shows two chromatograms using a gradient elution at a temperature of 60° C. (chromatogram A) and 30° C. (chromatogram B) with a chromatography resin based on a combination of sulfonate, carboxylate, and phosphonates cation exchange groups. The cation standard solution includes alkali metals, alkali earth metals, ammonium, and a different combination of alkyl amines and hydroxy alkyl amines than those tested in FIG. 8, which are 0.25 mg/L lithium (peak 1), 1.00 mg/L sodium (peak 2), 1.25 mg/L ammonium (peak 3), 2.50 mg/L potassium (peak 4), 2.50 mg/L methylamine (peak 5), 2.50 mg/L dimethylamine (peak 6), 5.0 mg/L dimethyl-ethanolamine (peak 7), 5.0 mg/L N-methyldiethanolamine (peak 8), 5.0 mg/L morpholine (peak 9), 5.0 mg/L diethylamine (peak 10), 5.0 mg/L diethylaminoethanol (peak 11), 1.25 mg/L magnesium (peak 12), and 2.5 mg/L calcium (peak 13).

A chromatography column containing a resin of Example 5 based on a combination of sulfonate, carboxylate, and phosphonates cation exchange groups was tested with a cation standard solution that contains alkali metals, alkali earth metals, ammonium, and a different combination of alkyl amines and hydroxy alkyl amines than those tested in Example 15. In this Example, chromatograms A and B of FIG. 9 were performed at 60° C. and 30° C., respectively. The chromatographic conditions were similar to Example 13. The cation standard solution contained 0.25 mg/L lithium, 1.00 mg/L sodium, 1.25 mg/L ammonium, 2.50 mg/L potassium, 2.50 mg/L methylamine, 2.50 mg/L dimethylamine, 5.0 mg/L dimethyl-ethanolamine, 5.0 mg/L N-methyldiethanolamine, 5.0 mg/L morpholine, 5.0 mg/L diethylamine, 5.0 mg/L diethylaminoethanol, 1.25 mg/L magnesium, and 2.5 mg/L calcium and these aforementioned cations respectively correspond to peaks 1 to 13 for chromatograms A and B of FIG. 9. Both Chromatograms A and B of FIG. 8 show good separation of the alkali metals, alkali earth metals, ammonium, and various hydroxy alkyl amines. Depending on the particular cations that need to be analyzed, a user can vary the column temperature to increase the resolution of the relevant peaks.

While preferred embodiments of the present invention have been shown and described herein, it will be apparent to those skilled in the art that such embodiments are provided by way of example only. Numerous variations, changes, and substitutions will now occur to those skilled in the art without departing from the invention. While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. Therefore, to the extent there are variations of the invention, which are within the spirit of the disclosure or equivalent to the inventions found in the claims, it is the intent that this patent will cover those variations as well.

What is claimed is:

1. A chromatography column, the column containing a packed bed of an ion exchange chromatographic packing material, the ion exchange chromatographic packing material comprising:
  a) support resin particles; and
  b) a copolymer comprising polymerized functional monomers that include a first ion exchange group monomer and a second ion exchange group monomer, where the first ion exchange group monomer and the second ion exchange group monomer are different,
  in which the first ion exchange group monomer is configured to have a first charge at a first pH, and the second ion exchange group monomer is configured to have a net neutral charge at the first pH,
  in which the first ion exchange group monomer is configured to have the first charge at a second pH, and the second ion exchange group monomer is configured to have a net neutral charge or a second charge at the second pH where the first charge and the second charge both have a same polarity, in which the first pH and the second pH are different,
  in which a mole percent of the second ion exchange group monomer is a mole amount of the second ion exchange group monomer divided by a summation of a mole amount of the first ion exchange group monomer and the mole amount of the second ion exchange group monomer, and multiplied by 100, the mole percent of the second ion exchange group monomer ranges from about 60% to about 99%,
  in which the copolymer is grafted to the support resin particles, in which the first ion exchange group monomer comprises a sulfonate group and the second ion exchange group monomer comprises a carboxylic acid group.

2. The chromatography column of claim 1, in which the mole percent of the second ion exchange group monomer is based on an equation comprising:

$$\% \ IEX_{2,mole} = [IEX_{2,mole}/(IEX_{1,mole}+IEX_{2,mole})] \times 100,$$

where % $IEX_{2,mole}$ is the mole percent for the second ion exchange group monomer, $IEX_{1,mole}$ is the mole amount of the first ion exchange group monomer, and $IEX_{2,mole}$ is the mole amount of the second ion exchange group monomer.

3. The chromatography column of claim 1, in which the mole percent of the second ion exchange group monomer ranges from about 80% to about 95%.

4. The chromatography column of claim 1, whereby, the first ion exchange group monomer is diluted by the second ion exchange group monomer such that 2% or less of the first ion exchange group monomers are adjacent to each other in the copolymer.

5. The chromatography column of claim 1, in which the polymerized functional monomers further include a third ion exchange group monomer, where the third ion exchange group monomer is different from the first ion exchange group monomer and the second ion exchange group monomer, in which the third ion exchange group monomer is configured to have a third charge at both the first pH and the second pH, where the third charge and the first charge both have the same polarity.

6. The chromatography column of claim 5, in which a mole percent of the third ion exchange group monomer is a mole amount of the third ion exchange group monomer divided by a summation of a mole amount of the first ion exchange group monomer, a mole amount of the second ion exchange group monomer, and the mole amount of the third ion exchange group monomer, the mole percent of the third ion exchange group monomer ranges from about 2% to about 10%.

7. The chromatography column of claim 6, in which the mole percent of the third ion exchange group monomer is based on an equation comprising:

$$\% \ IEX_{3,mole} = [IEX_{3,mole}/(IEX_{1,mole}+IEX_{2,mole}+IEX_{3,mole})] \times 100$$

where % $IEX_{3,mole}$ is the mole percent for the third ion exchange group, $IEX_{1,mole}$ is the mole amount of the first ion exchange group monomer, $IEX_{2,mole}$ is the mole amount of the second ion exchange group monomer, and $IEX_{3,mole}$ is the mole amount of the third ion exchange group monomer.

8. The chromatography column of claim 1, in which the support resin particle comprises a divinylbenzene crosslinking monomer and a support resin monomer, the support resin monomer is selected from a group consisting of an ethylvinylbenzene monomer, a styrene monomer, and a combination thereof.

9. The chromatography column of claim 1, in which the support resin particles have a diameter ranging from about 2 microns to about 20 microns.

10. The chromatography column of claim 1, in which the support resin particles have a surface area ranging from about 20 m²/g to about 800 m²/g.

11. The chromatography column of claim 8, in which the support resin particle comprises the divinylbenzene crosslinking monomer and the ethylvinylbenzene monomer, in which a mole percent of the divinylbenzene crosslinking monomer is a mole amount of the divinylbenzene crosslinking monomer divided by a summation of the mole amount of the divinylbenzene crosslinking monomer and a mole amount of the ethylvinylbenzene monomer, the mole percent of the divinylbenzene crosslinking monomer ranges from about 30% to about 99%.

12. The chromatography column of claim 1, in which the first ion exchange group monomer and the second ion exchange group monomer each comprise a cation exchange group.

13. The chromatography column of claim 5, in which the third ion exchange group monomer comprises a cation exchange group.

14. The chromatography column of claim 6, in which in which, the first ion exchange group monomer comprises a styrene sulfonate.

15. The chromatography column of claim 14, in which the second ion exchange group monomer comprises a methacrylic acid.

16. The chromatography column of claim 1, in which the second ion exchange group monomer is a zwitterion at the first pH.

17. The chromatography column of claim 15, in which the third ion exchange group monomer comprises a vinylphosphonate.

18. The chromatography column of claim 5, in which the first ion exchange group monomer, second ion exchange group monomer, and third ion exchange group monomer, each have a respective first, second, and third pKa values, where the first pKa is a smallest value of the first, second, and third pKa values, the second pKa is a largest value of the first, second, and third pKa values, and the third pKa is an intermediate value in between the first and second pKa values.

19. A system for chromatographically separating a sample, the system comprising:
   a pump configured to pump a mobile phase containing the sample from a liquid source;
   an electrolytic eluent generating device fluidically connected to the pump and configured to generate an eluent stream;
   an injection valve configured to inject an aliquot of the sample into the eluent stream;
   a chromatography column fluidically connected to the injection valve and configured to
   separate one or more analytes from matrix components in the sample, the
   chromatography column containing a packed bed of an ion exchange chromatographic
   packing material, the ion exchange chromatographic packing material comprising:
      a) support resin particles; and
      b) a copolymer comprising polymerized functional monomers that include a first ion exchange group monomer and a second ion exchange group monomer, where the first ion exchange group monomer and the second ion exchange group monomer are different,
      in which the first ion exchange group monomer is configured to have a first charge at a first pH, and the second ion exchange group monomer is configured to have a net neutral charge at the first pH,
      in which the first ion exchange group monomer is configured to have the first charge at a second pH, and the second ion exchange group monomer is configured to have a net neutral charge or a second charge at the second pH where the first charge and the second charge both have a same polarity, in which the first pH and the second pH are different,
      in which a mole percent of the second ion exchange group monomer is a mole amount of the second ion exchange group monomer divided by a summation of a mole amount of the first ion exchange group monomer and the mole amount of the second ion exchange group monomer, and multiplied by 100, the mole percent of the second ion exchange group monomer ranges from about 60% to about 99%,
   in which the copolymer is grafted to the support resin particles, in which the first ion exchange group monomer comprises a sulfonate group and the second ion exchange group monomer comprises a carboxylic acid group; and
   a detector fluidically connected to an output of the chromatography column.

20. A method of separating a sample, the method comprising:
   flowing a mobile phase containing a plug of the sample into a chromatography column, the column containing a packed bed of an ion exchange chromatographic packing material, the ion exchange chromatographic packing material comprising:
      a) support resin particles; and
      b) a copolymer comprising polymerized functional monomers that include a first ion exchange group monomer and a second ion exchange group monomer, where the first ion exchange group monomer and the second ion exchange group monomer are different,
      in which the first ion exchange group monomer is configured to have a first charge at a first pH, and the second ion exchange group monomer is configured to have a net neutral charge at the first pH,
      in which the first ion exchange group monomer is configured to have the first charge at a second pH, and the second ion exchange group monomer is configured to have a net neutral charge or a second charge at the second pH where the first charge and the second charge both have a same polarity, in which the first pH and the second pH are different,
      in which a mole percent of the second ion exchange group monomer is a mole amount of the second ion exchange group monomer divided by a summation of a mole amount of the first ion exchange group monomer and the mole amount of the second ion exchange group monomer, and multiplied by 100, the mole percent of the second ion exchange group monomer ranges from about 60% to about 99%,
   in which the copolymer is grafted to the support resin particles, in which the first ion exchange group monomer comprises a sulfonate group and the second ion exchange group monomer comprises a carboxylic acid group; separating the sample into one or more analyte bands in the chromatography column; and detecting the one or more analyte bands eluting off the chromatography column.

* * * * *